US009836533B1

(12) United States Patent
Levi et al.

(10) Patent No.: US 9,836,533 B1
(45) Date of Patent: Dec. 5, 2017

(54) APPARATUS, METHOD AND ARTICLE TO EFFECT USER INTEREST-BASED MATCHING IN A NETWORK ENVIRONMENT

(71) Applicant: PLENTYOFFISH MEDIA INC., Vancouver (CA)

(72) Inventors: Thomas S. Levi, Vancouver (CA); Steve Oldridge, Vancouver (CA)

(73) Assignee: PLENTYOFFISH MEDIA ULC, Vancouver (CA)

( * ) Notice: Subject to any disclaimer, the term of this patent is extended or adjusted under 35 U.S.C. 154(b) by 434 days.

(21) Appl. No.: 14/668,808

(22) Filed: Mar. 25, 2015

Related U.S. Application Data

(60) Provisional application No. 61/976,296, filed on Apr. 7, 2014.

(51) Int. Cl.
*G06F 17/30* (2006.01)

(52) U.S. Cl.
CPC .... *G06F 17/3071* (2013.01); *G06F 17/30684* (2013.01)

(58) Field of Classification Search
CPC .......................... G06F 17/3071; G06F 17/30684
USPC ......................................................... 707/739
See application file for complete search history.

(56) References Cited

U.S. PATENT DOCUMENTS

| 5,583,763 | A | 12/1996 | Atcheson et al. |
| 5,749,091 | A | 5/1998 | Ishida et al. |
| 5,963,951 | A | 10/1999 | Collins |
| 6,006,225 | A | 12/1999 | Bowman et al. |
| 6,018,738 | A | 1/2000 | Breese et al. |
| 6,038,295 | A | 3/2000 | Mattes |
| 6,041,311 | A | 3/2000 | Chislenko et al. |
| 6,049,777 | A | 4/2000 | Sheena et al. |
| 6,058,367 | A | 5/2000 | Sutcliffe et al. |
| 6,061,681 | A * | 5/2000 | Collins ................. G06Q 30/08 |
| 6,064,980 | A | 5/2000 | Jacobi et al. |
| 6,134,532 | A | 10/2000 | Lazarus et al. |
| 6,169,986 | B1 | 1/2001 | Bowman et al. |

(Continued)

OTHER PUBLICATIONS

Parimi, Rohit, et al., "Predicting Friendship Links in Social Networks Using a Topic Modeling Approach", PAKDD 2011, Shenzhen, China, Nay 2011, Proceedings, Part II, Springer, pp. 75-86.*

(Continued)

*Primary Examiner* — Robert Stevens
(74) *Attorney, Agent, or Firm* — Seed IP Law Group LLP

(57) ABSTRACT

Websites operated by relationship building service providers collect information from users for use in identifying candidate matches for a user. At least a portion of the information may include freeform text entered by the user to identify the user's interests. The freeform text entered by users may be preprocessed and a user interest group model formed using a generative Natural Language Process that is applied to determine user interest groups from the freeform text. Such user interest groups identify related words based on the frequency of their occurrence and relationship within the freeform text. Individual user interest group membership vectors for each user included in a number of users may be determined using the user interest group model. At least one compatibility aspect between users may then be assessed based on the similarity or distance between the user interest group membership vectors associated with each user.

64 Claims, 12 Drawing Sheets

(56) References Cited

U.S. PATENT DOCUMENTS

| | | | |
|---|---|---|---|
| 6,199,067 B1 | 3/2001 | Geller | |
| 6,266,649 B1 | 7/2001 | Linden et al. | |
| 6,356,879 B2 | 3/2002 | Aggarwal et al. | |
| 6,542,749 B2* | 4/2003 | Tanaka | H04W 76/002 455/41.2 |
| 6,735,568 B1 | 5/2004 | Buckwalter et al. | |
| 6,772,150 B1 | 8/2004 | Whitman et al. | |
| 6,782,370 B1 | 8/2004 | Stack | |
| 6,783,065 B2 | 8/2004 | Spitz et al. | |
| 6,853,982 B2 | 2/2005 | Smith et al. | |
| 6,912,505 B2 | 6/2005 | Linden et al. | |
| 7,113,917 B2 | 9/2006 | Jacobi et al. | |
| 7,240,353 B2 | 7/2007 | Lau et al. | |
| 7,313,536 B2 | 12/2007 | Westphal | |
| 7,324,998 B2 | 1/2008 | Beres et al. | |
| 7,562,814 B1 | 7/2009 | Shao et al. | |
| 8,122,142 B1 | 2/2012 | Svendsen et al. | |
| 8,180,765 B2 | 5/2012 | Nicolov | |
| 8,225,413 B1 | 7/2012 | De et al. | |
| 8,566,938 B1 | 10/2013 | Prakash et al. | |
| 8,577,874 B2 | 11/2013 | Svendsen et al. | |
| 8,620,790 B2 | 12/2013 | Priebatsch | |
| 8,626,663 B2 | 1/2014 | Nightengale et al. | |
| 8,825,802 B2 | 9/2014 | Pearce | |
| 8,930,398 B1 | 1/2015 | Kishore et al. | |
| 9,047,611 B2 | 6/2015 | Krishnamoorthy et al. | |
| 9,069,945 B2 | 6/2015 | Singh | |
| 9,219,704 B2 | 12/2015 | Hamlin et al. | |
| 9,536,221 B2 | 1/2017 | Frind | |
| 9,537,706 B2 | 1/2017 | Frind et al. | |
| 9,672,289 B1 | 6/2017 | Frind et al. | |
| 9,679,259 B1 | 6/2017 | Frind et al. | |
| 2002/0095303 A1 | 7/2002 | Asayama et al. | |
| 2002/0156632 A1 | 10/2002 | Haynes et al. | |
| 2002/0184080 A1 | 12/2002 | Murad et al. | |
| 2003/0065632 A1 | 4/2003 | Hubey | |
| 2003/0065635 A1 | 4/2003 | Sahami et al. | |
| 2003/0093405 A1 | 5/2003 | Mayer | |
| 2003/0234519 A1 | 12/2003 | Farmer | |
| 2004/0012638 A1 | 1/2004 | Donnelli et al. | |
| 2004/0107283 A1* | 6/2004 | Paddon | G06Q 30/06 709/229 |
| 2004/0260781 A1* | 12/2004 | Shostack | G06Q 30/02 709/207 |
| 2005/0027707 A1 | 2/2005 | Syed | |
| 2005/0108227 A1 | 5/2005 | Russell-Falla et al. | |
| 2005/0108344 A1 | 5/2005 | Tafoya et al. | |
| 2005/0240608 A1 | 10/2005 | Jones et al. | |
| 2006/0018522 A1 | 1/2006 | Sunzeri et al. | |
| 2006/0059142 A1* | 3/2006 | Zvinyatskovsky | G06Q 30/08 |
| 2006/0149766 A1 | 7/2006 | Ghoting et al. | |
| 2006/0256959 A1 | 11/2006 | Hymes | |
| 2007/0005587 A1 | 1/2007 | Johnson et al. | |
| 2007/0061334 A1 | 3/2007 | Ramer et al. | |
| 2007/0112792 A1 | 5/2007 | Majumder | |
| 2007/0129999 A1 | 6/2007 | Zhou et al. | |
| 2007/0156664 A1* | 7/2007 | Norton | G06Q 10/10 |
| 2007/0206917 A1 | 9/2007 | Ono et al. | |
| 2007/0265962 A1 | 11/2007 | Bowe, Jr. et al. | |
| 2007/0282621 A1* | 12/2007 | Altman | G06Q 10/10 705/319 |
| 2008/0039121 A1 | 2/2008 | Muller | |
| 2008/0086534 A1 | 4/2008 | Bardak et al. | |
| 2008/0103971 A1 | 5/2008 | Lukose et al. | |
| 2008/0189122 A1 | 8/2008 | Coletrane et al. | |
| 2009/0044279 A1 | 2/2009 | Crawford et al. | |
| 2009/0066722 A1 | 3/2009 | Kriger et al. | |
| 2009/0094048 A1 | 4/2009 | Wallace et al. | |
| 2009/0106043 A1 | 4/2009 | Buckwalter et al. | |
| 2009/0144329 A1 | 6/2009 | Marlow | |
| 2009/0164464 A1 | 6/2009 | Carrico et al. | |
| 2009/0216734 A1 | 8/2009 | Aghajanyan et al. | |
| 2009/0248599 A1 | 10/2009 | Hueter et al. | |
| 2009/0299645 A1 | 12/2009 | Colby et al. | |
| 2010/0002920 A1 | 1/2010 | Cosatto et al. | |
| 2010/0036806 A1 | 2/2010 | Lam et al. | |
| 2010/0094767 A1 | 4/2010 | Miltonberger | |
| 2010/0114614 A1 | 5/2010 | Sharpe | |
| 2010/0169376 A1 | 7/2010 | Chu | |
| 2010/0262611 A1 | 10/2010 | Frind | |
| 2010/0318544 A1 | 12/2010 | Nicolov | |
| 2011/0107260 A1 | 5/2011 | Park et al. | |
| 2011/0131085 A1 | 6/2011 | Wey | |
| 2011/0145238 A1 | 6/2011 | Stork | |
| 2011/0167059 A1 | 7/2011 | Fallah | |
| 2011/0178881 A1 | 7/2011 | Pulletikurty | |
| 2011/0208737 A1 | 8/2011 | Shmueli et al. | |
| 2011/0219310 A1 | 9/2011 | Robson | |
| 2011/0231396 A1 | 9/2011 | Dhara et al. | |
| 2011/0270813 A1 | 11/2011 | Cok et al. | |
| 2011/0306028 A1 | 12/2011 | Galimore | |
| 2012/0059850 A1 | 3/2012 | Bent et al. | |
| 2012/0088524 A1 | 4/2012 | Moldavsky et al. | |
| 2012/0089618 A1 | 4/2012 | Anschutz et al. | |
| 2012/0102410 A1 | 4/2012 | Gewecke et al. | |
| 2012/0109959 A1 | 5/2012 | Benhadda | |
| 2012/0110085 A1 | 5/2012 | Malik et al. | |
| 2012/0123828 A1 | 5/2012 | Pahls et al. | |
| 2012/0151417 A1 | 6/2012 | Wong et al. | |
| 2012/0166285 A1 | 6/2012 | Shapiro et al. | |
| 2012/0190386 A1 | 7/2012 | Anderson | |
| 2012/0197802 A1 | 8/2012 | Smith et al. | |
| 2012/0198002 A1 | 8/2012 | Goulart et al. | |
| 2012/0284341 A1 | 11/2012 | Masood et al. | |
| 2013/0097246 A1 | 4/2013 | Zifroni et al. | |
| 2013/0138741 A1 | 5/2013 | Redstone et al. | |
| 2013/0262984 A1 | 10/2013 | Mehr et al. | |
| 2013/0282745 A1 | 10/2013 | Mishra et al. | |
| 2013/0297590 A1* | 11/2013 | Zukovsky | G06F 17/30867 707/722 |
| 2013/0325948 A1 | 12/2013 | Chen et al. | |
| 2014/0052861 A1 | 2/2014 | Frind et al. | |
| 2014/0058763 A1 | 2/2014 | Zizzamia et al. | |
| 2014/0079297 A1 | 3/2014 | Tadayon et al. | |
| 2014/0095598 A1 | 4/2014 | Schornack et al. | |
| 2014/0095603 A1 | 4/2014 | Bhardwaj et al. | |
| 2014/0122628 A1 | 5/2014 | Yao et al. | |
| 2014/0136933 A1 | 5/2014 | Berger et al. | |
| 2014/0156750 A1 | 6/2014 | De Cristofaro et al. | |
| 2014/0207637 A1 | 7/2014 | Groarke | |
| 2015/0120583 A1 | 4/2015 | Zarrella | |
| 2015/0379574 A1 | 12/2015 | Pattan et al. | |

OTHER PUBLICATIONS

Zhao, Xiaojian, et al., "Relationship strength estimation for online social networks with the study on Facebook", Neurocomputing, vol. 95, Elsevier, Oct. 15, 2012, pp. 89-97.*

Khadangi, Ehsan, et al., "Measuring Relationship Strength in Online Social Networks based on users' activities and profile information", ICCKE 2013, Oct. 31-Nov. 1, 2013, 5 pages.*

Arbelaitz, Olatz, et al., "Web usage and content mining to extract knowledge for modelling the users of the Bidasoa Turismo website and to adapt to it", Expert Systems with Applications, vol. 40, Issue 18, Elsevier, Dec. 15, 2013, pp. 7478-7491.*

Peled, Olga, et al., "Entity Matching in Online Social Networks", SocialCom 2013, Washington, DC, Sep. 8-14, 2013, pp. 339-344.*

Dokoohaki, Nima, et al., "Mining Divergent Opinion Trust Networks through Latent Dirichlet Allocation", ASONAM 2012, Istanbul, Turkey, Aug. 26-29, 2012, pp. 879-886.*

Paolillo, John C., et al., "Social Network Analysis on the Semantic Web: Techniques and Challenges for Visualizing FOAF", Chapter 14, Visualizing the Semantic Web, Springer London, (c) 2006, pp. 229-241.*

"Binary search tree," Wikipedia, retrieved on Feb. 24, 2015, from http://en.wikipedia.org/wiki/Binary_search_tree, 11 pages.

"Chargeback," Wikipedia, retrieved on Feb. 24, 2015, from http://en.wikipedia.org/wiki/Chargeback, 4 pages.

"Merchant account," Wikipedia, retrieved on Feb. 24, 2015, from http://en.wikipedia.org/wiki/Merchant_account, 10 pages.

(56) References Cited

OTHER PUBLICATIONS

"Understanding Chargebacks: A Guide to Chargebacks for Online Merchants," DalPay, retrieved on Feb. 24, 2015, from https://www.dalpay.com/en/support/chargebacks.html, 6 pages.
Frind et al., "Apparatus, Method and Article to Facilitate Matching of Clients in a Networked Environment," U.S. Appl. No. 14/339,328, filed Jul. 23, 2014, 135 pages.
Frind et al., "Apparatus, Method and Article to Facilitate Matching of Clients in a Networked Environment," Preliminary Amendment filed Jul. 23, 2014, for U.S. Appl. No. 14/339,328, 11 pages.
Frind et al., "Systems and Methods for Training and Employing a Machine Learning System in Evaluating Entity Pairs," U.S. Appl. No. 14/163,849, filed Jan. 24, 2014, 75 pages.
Frind, "System and Method for Adaptive Matching of User Profiles Based on Viewing and Contact Activity for Social Relationship Services," Preliminary Amendment dated May 24, 2011, for U.S. Appl. No. 12/488,512, 22 pages.
Frind, "System and Method for Adaptive Matching of User Profiles Based on Viewing and Contact Activity for Social Relationship Services," Office Action dated Aug. 16, 2011, for U.S. Appl. No. 12/488,512, 14 pages.
Frind, "System and Method for Adaptive Matching of User Profiles Based on Viewing and Contact Activity for Social Relationship Services," Amendment dated Nov. 16, 2011, for U.S. Appl. No. 12/488,512, 16 pages.
Frind, "System and Method for Adaptive Matching of User Profiles Based on Viewing and Contact Activity for Social Relationship Services," Office Action dated Mar. 5, 2012, for U.S. Appl. No. 12/488,512, 19 pages.
Frind, "System and Method for Adaptive Matching of User Profiles Based on Viewing and Contact Activity for Social Relationship Services," Amendment dated May 24, 2012, for U.S. Appl. No. 12/488,512, 20 pages.
Frind, "System and Method for Adaptive Matching of User Profiles Based on Viewing and Contact Activity for Social Relationship Services," Office Action dated May 19, 2014, for U.S. Appl. No. 12/488,512, 20 pages.
Frind, "System and Method for Adaptive Matching of User Profiles Based on Viewing and Contact Activity for Social Relationship Services," Amendment dated Aug. 12, 2014, for U.S. Appl. No. 12/488,512, 11 pages.
Frind, "System and Method for Adaptive Matching of User Profiles Based on Viewing and Contact Activity for Social Relationship Services," Office Action dated Nov. 18, 2014, for U.S. Appl. No. 12/488,512, 17 pages.
Frind, "System and Method for Adaptive Matching of User Profiles Based on Viewing and Contact Activity for Social Relationship Services," Amendment dated Jan. 6, 2015, for U.S. Appl. No. 12/488,512, 12 pages.
Frind, "System and Method for Adaptive Matching of User Profiles Based on Viewing and Contact Activity for Social Relationship Services," Amendment dated Feb. 13, 2015, for U.S. Appl. No. 12/488,512, 12 pages.
Kuchka et al., "Apparatus, Method and Article to Identify Discrepancies Between Clients and in Response Prompt Clients in a Networked Environment," U.S. Appl. No. 14/204,939, filed Mar. 11, 2014, 92 pages.
Levi et al., "Apparatus, Method and Article to Facilitate Automatic Detection and Removal of Fraudulent User Information in a Network Environment," U.S. Appl. No. 14/561,004, filed Dec. 4, 2014, 89 pages.
MacKinnon, "Apparatus, Method and Article to Facilitate Exchange of Messages in a Network Environment," U.S. Appl. No. 14/575,888, filed Dec. 18, 2014, 83 pages.
Oldridge et al., "Apparatus, Method and Article to Effect Electronic Message Reply Rate Matching in a Network Environment," U.S. Appl. No. 14/563,504, filed Dec. 8, 2014, 55 pages.
Oldridge et al., "Apparatus, Method and Article to Facilitate User Behavioral Based Dertermination of User Values in a Network Environment," U.S. Appl. No. 62/013,849, filed Jun. 18, 2014, 68 pages.
Oldridge et al., "Apparatus, Method and Article to Predict and Prevent Chargebacks in a Network Environment," U.S. Appl. No. 14/679,792, filed Apr. 6, 2015, 69 pages.
Oldridge et al., "Systems and Methods for Training and Employing a Machine Learning System in Providing Service Level Upgrade Offers," U.S. Appl. No. 14/672,749, filed Mar. 30, 2015, 95 pages.
Tekle et al., "Apparatus, Method and Article to Facilitate Automatic Detection and Removal of Fraudulent Advertising Accounts in a Network Environment," U.S. Appl. No. 14/638,225, filed Mar. 4, 2015, 79 pages.
Therneau et al., "An Introduction to Recursive Partitioning Using the RPART Routines," Mayo Clinic, Feb. 24, 2015, 62 pages.
Frind et al., "Apparatus, Method and Article to Facilitate Matching of Clients in a Networked Environment," Amendment dated Dec. 8, 2015, for U.S. Appl. No. 13/971,483, 33 pages.
Frind et al., "Apparatus, Method and Article to Facilitate Matching of Clients in a Networked Environment," Office Action, dated Apr. 6, 2016, for U.S. Appl. No. 13/971,483, 26 pages.
Frind et al. "Apparatus, Method and Article to Facilitate Matching of Clients in a Networked Environment," Office Action, dated Sep. 21, 2015, for U.S. Appl. No. 13/971,483, 25 pages.
Frind et al., "Apparatus, Method and Article to Facilitate Matching of Clients in a Networked Environment," U.S. Appl. No. 61/857,617, filed Jul. 23, 2013,138 pages.
Frind et al., "Apparatus, Method and Article to Facilitate Matching of Clients in a Networked Environment," U.S. Appl. No. 61/691,082, filed Aug. 20, 2012, 131 pages.
Frind, "System and Method for Adaptive Matching of User Profiles Based on Viewing and Contact Activity for Social Relationship Services," Amendment dated Sep. 24, 2015, for U.S. Appl. No. 12/488,512, 14 pages.
Frind, "System and Method for Adaptive Matching of User Profiles Based on Viewing and Contact Activity for Social Relationship Services," Amendment dated Mar. 11, 2016, for U.S. Appl. No. 12/488,512, 15 pages.
Frind, "System and Method for Adaptive Matching of User Profiles Based on Viewing and Contact Activity for Social Relationship Services," Office Action, dated Jun. 24, 2015, for U.S. Appl. No. 12/488,512, 19 pages.
Frind, "System and Method for Adaptive Matching of User Profiles Based on Viewing and Contact Activity for Social Relationship Services," Office Action, dated Nov. 12, 2015, for U.S. Appl. No. 12/488,512, 21 pages.
Frind et al., "Systems and Methods for Training and Employing a Machine Learning System in Evaluating Entity Pairs," Amendment dated May 27, 2016, for U.S. Appl. No. 14/163,849, 23 pages.
Frind et al., "Systems and Methods for Training and Employing a Machine Learning System in Evaluating Entity Pairs," Office Action, dated Jan. 29, 2016, for U.S. Appl. No. 14/163,849, 61 pages.
Frind et al., "System and Methods for Training and Employing a Machine Learning System in Evaluating Entity Pairs," U.S. Appl. No. 61/756,912, filed Jan. 25, 2013, 75 pages.
Kuchka et al., "Apparatus, Method and Article to Identify Discrepancies Between Clients and in Response Prompt Clients in a Networked Environment," U.S. Appl. No. 61/780,391, filed Mar. 13, 2013, 92 pages.
Kuchka et al., "Apparatus, Method and Article to Identify Discrepancies Between Clients and in Response Prompt Clients in a Networked Environment," Office Action, dated Apr. 4, 2016, for U.S. Appl. No. 14/204,939, 80 pages.
Levi et al., "Apparatus, Method and Article to Facilitate Detection and Removal of Fraudulent User Information in a Network Environment," U.S. Appl. No. 61/911,908, filed Dec. 4, 2013, 88 pages.
MacKinnon, "Apparatus, Method and Article to Facilitate Exchange of Messages in a Network Environment," U.S. Appl. No. 61/918,466, filed Dec. 19, 2013, 83 pages.

(56) References Cited

OTHER PUBLICATIONS

Oldridge et al., "Apparatus, Method and Article to Effect Electronic Message Reply Rate Matching in a Network Environment," U.S. Appl. No. 61/914,154, filed Dec. 10, 2013, 50 pages.
Oldridge et al., "Apparatus, Method and Article to Facilitate User Behavioral Based Determination of User Values in a Network Environment," U.S. Appl. No. 14/737,121, filed Jun. 11, 2015, 68 pages.
Oldridge et al. "Systems and Methods for Training and Employing a Machine Learning System in Providing Service Level Upgrade Offers," U.S. Appl. No. 61/974,129, filed Apr. 2, 2014, 95 pages.
Tekle et al. "Apparatus, Method and Article to Facilitate Automatic Detection and Removal of Fraudulent Advertising Accounts in a Network Environment," U.S. Appl. No. 61/948,159, filed Mar. 5, 2014, 79 pages.
Alsaleh et al., "Improving Matching Process in Social Network Using Implicit and Explicit User Information," *Web Technologies and Applications* 313-320, 2011.
Frind et al. "Systems and Methods for Training and Employing a Machine Learning System in Evaluating Entity Pairs," Office Action, dated Aug. 16, 2016, for U.S. Appl. No. 14/163,849, 60 pages.
Kuchka et al., "Apparatus, Method and Article to Identify Discrepancies Between Clients and in Response Prompt Clients in a Networked Environment," Amendment, dated Aug. 4, 2016, for U.S. Appl. No. 14/204,939, 38 pages.
Kuchka et al., "Apparatus, Method and Article to Identify Discrepancies Between Clients and in Response Prompt Clients in a Networked Environment," Office Action, dated Sep. 8, 2016, for U.S. Appl. No. 14/204,939, 104 pages.
Fiore et al., "Assessing Attractiveness in Online Dating Profiles," *CHI 2008 Proceedings—Friends, Foe, and Family*, pp. 797-806, 2008.
Frind et al., "Apparatus, Method and Article to Facilitate Matching of Clients in a Networked Environment," Response, dated Jul. 21, 2016, for U.S. Appl. No. 13/971,483, 21 pages.
Notice of Allowance, dated Aug. 24, 2016, for U.S. Appl. No. 12/488,512, Frind, "System and Method for Adaptive Matching of User Profiles Based on Viewing and Contact Activity for Social Relationship Services," 20 pages.
Office Action, dated Sep. 20, 2016, for U.S. Appl. No. 14/339,328, Frind et al., "Apparatus, Method and Article to Facilitate Matching of Clients in a Networked Environment," 30 pages.
Artzi et al., "Predicting Responses to Microblog Posts," *NAACL HLT '12 Proceedings of the 2012 Conference of the North American Chapter of the Association for Computational Linguistics: Human Language Technologies*, Montreal, Canada, Jun. 3-8, 2012, pp. 602-606.
Avrahami et al., "Responsiveness in Instant Messaging: Predictive Models Supporting Inter-Personal Communication," *Proceedings of the SIGCHI Conference on Human Factors in Computing Systems*, Montréal, Québec, Canada, Apr. 22-27, 2006, pp. 731-740.
Kononenko, "Semi-Naïve Bayesian Classifier," *EWSL-91 Proceedings of the European working session on learning on Machine learning*, Porto, Portugal, 1991, pp. 206-219.
Notice of Allowance, dated Feb. 10, 2017, for U.S. Appl. No. 14/163,849, Frind et al., "Systems and Methods for Training and Employing a Machine Learning System in Evaluating Entity Pairs," 5 pages.
Notice of Allowance, dated Feb. 3, 2017, for U.S. Appl. No. 14/339,328, Frind et al., "Apparatus, Method and Article to Facilitate Matching of Clients in a Networked Environment," 14 pages.
Office Action, dated Feb. 3, 2017, for U.S. Appl. No. 14/561,004, Levi et al., "Apparatus, Method and Article to Facilitate Automatic Detection and Removal of Fraudulent User Information in a Network Environment," 23 pages.
Office Action, dated Jul. 13, 2017, for U.S. Appl. No. 14/638,225, Tekle et al., "Apparatus, Method and Article to Facilitate Automatic Detection and Removal of Fraudulent Advertising Accounts in a Network Environment," 59 pages.
Office Action, dated Jul. 5, 2017, for U.S. Appl. No. 14/563,504, Oldridge et al., "Apparatus, Method and Article to Effect Electronic Message Reply Rate Matching in a Network Environment," 20 pages.
Office Action, dated May 17, 2017, for U.S. Appl. No. 14/204,939, Kuchka et al., "Apparatus, Method and Article to Identify Discrepancies Between Clients and in Response Prompt Clients in a Networked Environment," 82 Pages.
Supplemental Notice of Allowability, dated Oct. 28, 2016, for U.S. Appl. No. 13/971,483, Frind et al., "Apparatus, Method and Article to Facilitate Matching of Clients in a Networked Environment," 9 pages.

\* cited by examiner

APPARATUS, METHOD AND ARTICLE TO EFFECT USER INTEREST-BASED MATCHING IN A NETWORK ENVIRONMENT

BACKGROUND

Technical Field

The present disclosure generally relates to computing systems and methods, and in particular to systems and methods that facilitate interest-based matching of users within a user network.

Description of the Related Art

Pairing or match-making finds use and purpose in many areas, from the smallest of interpersonal relationships to the largest of commercial partnerships. Pairing or matching may be used for finding compatible individuals suitable for a particular position or job, or even finding matching goods (e.g., consumer goods, movies, music) or services with individuals based on the preferences of the individual. With the extraordinary reach of the Internet into virtually every country on the planet and the computational power of modern-day processors, the extension of personal and commercial pairing or match-making into the digital world could be viewed as inevitable.

Typically, a user begins participating in such match-matching or pairing Websites by providing information used by the Website in selecting or otherwise identifying candidate matches or pairings for the user. Such information is typically collected during a registration process performed by the user and may include a variety of data inputs provided by the user, such as in the form of a "personality profile" or "interests profile." At times, such information may be provided by the user as freeform text, i.e., text entered by the user that is not format constrained. For example, the Website operator or pairing service provider may provide the user with a Webpage containing a text box and ask "Please tell us about the activities you enjoy." In response, a first user may enter "snow skiing, snowboarding, and ice climbing" while a second user may enter "water skiing, swimming, snorkeling, and scuba diving."

When confronted with such freeform text entries, traditional pairing or matching algorithms may search for words common to both users as indicative of a candidate pairing. In the preceding example, the term "skiing" appears in the freeform text entry provided by both the first user and the second user. However, the freeform entry of the first user indicates a preference for cold weather activities while the freeform entry of the second user indicates a preference for warm weather activities. While a pairing between the first and second users may be possible, the fact that the users have indicated different seasonal activities increases the likelihood that the pairing is somewhat less than ideal.

What is needed therefore are automated entity pairing systems and methods that are capable of matching or otherwise pairing entities having near, but non-matching, attributes or dissimilar attributes that may have been found compatible based on historically successful matches or pairings.

BRIEF SUMMARY

Websites, such as relationship building, matching, or pairing Websites collect a wealth of data on Website users, typically as part of the relationship building or matching process. At times, a first portion of such collected data may be self-reported by the respective user while a second portion of such data may be autonomously collected by a server or other system housing the Website, for example such data may be extracted from the user's processor-based device communicating with the Website. In some instances, users may enter freeform text, for example using a keyboard or keypad to enter text into a text field or similar logical structure. Such freeform text is often used to provide the user with the ability to enter interests, goals, desires, and similar profile aspects that are difficult or impossible to capture using more traditional radio-button or "check box" type inputs. Quite often, the user input provided as freeform text supplies key insights into a user's preferences that, in turn, provide a significant indicator for selection of interest compatible candidate matches. The inherent flexibility and breadth of available user vocabulary however impedes the effective and efficient use of such freeform text in the pairing or relationship building process outside of finding literal text matches in user profiles.

The Applicants have found an analysis technique permitting the autonomous analysis of freeform text found in the profiles of relationship building or pairing Website users. The process commences by optionally preprocessing the freeform text data to remove non-letter characters and stop words (e.g., words such as "I" "the" "a" and others that provide no information regarding the user's interests) from the freeform text provided by the user. In some implementations, some or all of the words included in the freeform text may be stemmed, for example using a Porter stemming technique. After any preprocessing, the process autonomously creates a defined number of user interest groups based on the content and structure of freeform text entries provided by a user population. Words are classified or categorized within each user interest group based upon a measure of their "indicativeness" or "representativeness" of the user interest group as a whole. Thus, for a user interest group such as "outdoor team sports" words such as "baseball," "football," and "soccer" may be highly ranked (all are outdoor team sports); "basketball" and "ice hockey" may be intermediately ranked (all are indoor team sports); and "chess" may be low ranked (neither a team nor outdoor sport).

Advantageously, such a user interest group model is possible for each language and/or each dialect of a language. Additionally, since the model is generated based on both the words and their relationship, the model tends to reflect local culture, vernacular, and mores. Thus, the evaluation system is equally implementable and effective in finding candidate matches that reflect local language and culture around the world. Furthermore, even commonly misspelled words will be included in the user interest group model by their presence among other freeform text which provides context for the inclusion of the misspelled words at an appropriate location within the user interest groups.

Based at least in part on the word distribution within each user interest group, the freeform text inputted by each user is evaluated to generate a user interest group membership vector for each user included in the user population. The user interest group membership vector is an n-component vector, where each of the "n" components corresponds to a value indicative of the respective user's interest in a corresponding one of the "n" number of user interest groups. Each user interest group membership vector therefore characterizes the interests of the respective user as expressed by the language in the respective user's freeform text. Various methods may then be used to analyze at least one aspect of compatibility between users based on the interests expressed in the user's freeform text provided to the service provider. One aspect of compatibility between users may be measured by the degree of similarity and/or distance between user interest group vectors for various candidate user pairings. Such analysis methods may include determining the cosine similarity or the Euclidean distance between two user interest group vectors.

In addition to assessing one or more aspects of compatibility between users based on their respective user interest group membership vectors, such vectors may be used in other, surprisingly, beneficial applications. In a first instance, a user may provide a freeform text entry of interests they would find "desirable" or "ideal" in candidate matches. Using this information, the evaluation system can generate a "hypothetical" user interest group membership vector using the ideal interests entered by the user which is then used to provide candidate matches to the user. In a second instance, a single hypothetical user interest group membership vector may be generated for a group of users. To assess compatibility of new users with the group, the evaluation system may assess the hypothetical user interest group membership vector and the user's user interest group membership vector. In a third instance, a user may identify another user whom they find has desirable or ideal interests. The evaluation system can use the user interest group membership vector associated with identified user to identify and provide candidate matches to the user. In a fourth instance, a user may express an interest in another user by their actions such as hovering over another user's picture or repeatedly visiting another user's profile. The evaluation system can use the user interest group membership vector associated with the other user to identify and provide candidate matches to the user.

A method of operation in an evaluation system, the evaluation system including at least one processor and at least one nontransitory processor-readable medium that stores at least one of processor-executable instructions or data, the at least one nontransitory processor-readable medium communicatively coupled to the at least one processor, the method may be summarized as including: deriving by the at least one processor a set of user interest groups from a plurality of user interests specified by a plurality of users as freeform text, where the number of interest groups in the set of user interest groups is less than a total number of user interests in the plurality of user interests specified by the plurality of users; for each of a number of the users, determining by the at least one processor a respective interest group membership vector based on respective user interests specified by the respective user, the interest group membership vector having one or more elements which represent a partial membership in respective ones of one or more of the interest groups; and assessing by the at least one processor at least one of the users based at least in part on at least one of the interest group membership vectors.

Assessing at least one of the users based at least in part on at least one of the interest group membership vectors may include comparing a respective interest group membership vector for a first one of the users with the respective interest group membership vector for at least one other one of the users. Comparing a respective interest group membership vector for a first one of the users with the respective interest group membership vector for at least one other one of the users may include determining a distance between the respective interest group membership vector for the first one of the users and the respective interest group membership vector for the at least one other one of the users. Comparing a respective interest group membership vector for a first one of the users with the respective interest group membership vector for at least one other one of the users may include determining a similarity between the respective interest group membership vector for the first one of the users and the respective interest group membership vector for the at least one other one of the users.

The method of operation in an evaluation system may further include, for at least one of the interest group membership vectors, normalizing by the at least one processor the respective interest group membership vector, and wherein assessing at least one of the users based at least in part on at least one of the interest group membership vectors may include assessing at least a first one of the users based at least in part on the normalized respective interest group membership vector for the first one of the users.

For each of a number of the users, determining a respective interest group membership vector based on respective user interests specified by the respective user may include determining a respective interest group membership vector for each active user associated with a first defined language or first defined dialect of a language.

The method of operation in an evaluation system may further include: receiving the plurality of user interests specified by the plurality of users as freeform text; and preprocessing the received plurality of user interests specified by the plurality of users as freeform text.

Preprocessing the received plurality of user interests specified by the plurality of users as freeform text may include at least one of: removing by the at least one processor characters that are not valid letters in a valid language from the received plurality of user interests specified by the plurality of users as freeform text; removing by the at least one processor stop words from the received plurality of user interests specified by the plurality of users as freeform text; or performing by the at least one processor stemming on the received plurality of user interests specified by the plurality of users as freeform text. Deriving a set of user interest groups from a plurality of user interests specified by a plurality of users as freeform text may include deriving the set of interest groups from the preprocessed plurality of user interests specified by the plurality of users, which user interests may include at least one incorrect spelling of a user interest, and at least one pair of alternative names for a given user interest. Deriving a set of user interest groups from a plurality of user interests specified by a plurality of users as freeform text may include generating a generative natural language processing model based at least in part on the plurality of user interests specified by the plurality of users as freeform text. Generating a generative natural language processing model may include preforming a Latent Dirichlet Allocation on preprocessed user interests specified by the plurality of users as freeform text. Each of the users may provide a respective set of user interest words in freeform text and deriving a set of user interest groups from a plurality of user interests specified by a plurality of users as freeform text may include computing for a number of interest words a respective interest word frequency-inverse set of user interest words frequency.

The method of operation in an evaluation system may further include: receiving a set of self-specified user interests provided by a first one of the users, and wherein assessing at least one of the users based at least in part on at least one of the interest group membership vectors may include assessing potential matches with other ones of the users based on an assessment in commonality or differences between the respective interest group membership vector of the first one of the users and respective interest group membership vectors of the other ones of the users.

The method of operation in an evaluation system may further include: receiving a set of user interests desired by a first one of the users in another one of the users; generating a hypothetical interest group membership vector based on the received set of user interests desired by the first one of the users in another one of the users, and wherein assessing at least one of the users based at least in part on at least one of the interest group membership vectors may include assessing potential matches with other ones of the users based on an assessment in commonality or differences between the hypothetical interest group membership vector and respective interest group membership vectors of the other ones of the users.

The method of operation in an evaluation system may further include: receiving an identification of one user by a first one of the users, and wherein assessing at least one of the users based at least in part on at least one of the interest group membership vectors may include assessing potential matches with other ones of the users based on an assessment in commonality or differences between a respective interest group membership vector of the identified one of the users and respective interest group membership vectors of other ones of the users.

Receiving an identification of one user by a first one of the users may include receiving identification of at least one user who has at least one trait, other than user interests, which disqualifies the respective at least one user as a match for the first one of the users.

The method of operation in an evaluation system may further include: detecting an interest in one user by a first one of the users, and wherein assessing at least one of the users based at least in part on at least one of the interest group membership vectors may include assessing potential matches with other ones of the users based on an assessment in commonality or differences between a respective interest group membership vector of the one of the users in which the interest was detected and respective interest group membership vectors of other ones of the users.

The method of operation in an evaluation system may further include: selecting by the at least one processor a first subset of the users based on traits other than user interests, and wherein assessing at least one of the users based at least in part on at least one of the interest group membership vectors may include assessing a compatibility of the users of the first subset of users with a first one of the users based on a respective interest group membership vector for the first one of the users with the respective interest group membership vector for the other one of the users in the first subset of the users.

The method of operation in an evaluation system may further include: determining by the at least one processor at least one hypothetical interest group membership vector based on the respective interest group membership vectors of a plurality of the users, and wherein assessing at least one of the users based at least in part on at least one of the interest group membership vectors may include comparing a respective interest group membership vector for a first user with the at least one hypothetical interest group membership vector.

Determining at least one hypothetical interest group membership vector based on the respective interest group membership vectors of a plurality of the users may include determining at least one of a mean or median of the respective interest group membership vectors of the set of users. Determining at least one hypothetical interest group membership vector based on the respective interest group membership vectors of a plurality of the users may include determining the at least one hypothetical interest group membership vector based on the respective interest group membership vectors of a set of users that each have at least two demographic attributes in common. Determining at least one hypothetical interest group membership vector based on the respective interest group membership vectors of a plurality of the users may include determining the at least one hypothetical interest group membership vector based on the respective interest group membership vectors of a set of users that each have a geographic locale in common.

The method of operation in an evaluation system may further include: determining a relative distance between the respective interest group membership vector of the first user and the at least one hypothetical interest group membership vector; and providing an indication of the determined relative distance.

The method of operation in an evaluation system may further include: identifying at least one other set of users with which the first user is more compatible based on the respective interest group membership vector of the first user and at least one hypothetical interest group membership vector of the at least one other set of users; and providing an indication of the determined other set of users with which the first user is more compatible.

The method of operation in an evaluation system may further include: selecting the set of users based on at least a first characteristic that is common to the users of the first set; and selecting the at least one other set of users based on at least a second characteristic that is common to the users of the second set and not common to the users of the first set.

The method of operation in an evaluation system may further include: selecting the set of users based on at least a first geographical locale that is common to the users of the first set; and selecting the at least one other set of users based on at least a second geographic locale that is common to the users of the second set and not common to the users of the first set.

The method of operation in an evaluation system may further include: selecting a first subset of the users based on traits other than user interests, and wherein assessing at least one of the users based at least in part on at least one of the interest group membership vectors includes assessing a dissimilarity of the users of the first subset of users with a first one of the users based on a respective interest group membership vector for the first one of the users with the respective interest group membership vector for the other one of the users in the first subset of the users.

The method of operation in an evaluation system may further include determining at least one hypothetical interest group membership vector based on the respective interest group membership vectors of a plurality of the users, and wherein assessing at least one of the users based at least in part on at least one of the interest group membership vectors includes displaying at least one interest-based characteristic of the group identified at least in part via the hypothetical interest group membership vector.

The method of operation in an evaluation system may further include: determining a first hypothetical interest group membership vector based on the respective interest group membership vectors of a first plurality of the users. The method of operation may additionally include determining a second hypothetical interest group membership vector based on the respective interest group membership vectors of a second plurality of the users. In such methods assessing at least one of the users based at least in part on at least one of the interest group membership vectors includes determining at least one of a similarity or a dissimilarity between the first plurality of the users the second plurality of the users by comparing the first hypothetical interest group membership vector with the second hypothetical group membership vector.

The method of operation in an evaluation system may further include: determining the first hypothetical interest group membership vector based on the respective interest group membership vectors of the first plurality of the users who share at least a first non-interest based trait. The method of operation in an evaluation system may further include determining a second hypothetical interest group membership vector based on the respective interest group membership vectors of the second plurality of the users who share at least a second non-interest based trait that is different than the second non-interest based trait. In such methods assessing at least one of the users based at least in part on at least one of the interest group membership vectors includes comparing the interests of the first plurality of the users as provided by the first hypothetical interest group membership vector with the interests of the second plurality of the users as provided by the second hypothetical group membership vector. In such methods determining the first hypothetical interest group membership vector based on the respective interest group membership vectors of the first plurality of the users who share at least a first non-interest based trait includes determining the first hypothetical interest group membership vector based on the respective interest group membership vectors of the first plurality of the users who share at least a first non-interest based trait that includes a defined first geographic location. In such methods determining the second hypothetical interest group membership vector based on the respective interest group membership vectors of the second plurality of the users who share at least a second non-interest based trait includes determining the second hypothetical interest group membership vector based on the respective interest group membership vectors of the second plurality of the users who share a third non-interest based trait that includes a defined second geographic location. In such methods, the first plurality of the users and the second plurality of the users share at least a third non-interest based trait and determining by the at least one processor the first hypothetical interest group membership vector based on the respective interest group membership vectors of the first plurality of the users who share at least a first non-interest based trait and a second non-interest based trait includes determining by the at least one processor the first hypothetical interest group membership vector based on the respective interest group membership vectors of the first plurality of the users who share at least a first non-interest based trait that includes a defined first geographic location and a third non-interest based trait. In such methods, the second hypothetical interest group membership vector based on the respective interest group membership vectors of the second plurality of the users who share at least the second non-interest based trait and a third non-interest based trait includes determining by the at least one processor the second hypothetical interest group membership vector based on the respective interest group membership vectors of the second plurality of the users who share at least the second non-interest based trait that includes a defined second geographic location and a third non-interest based trait.

An evaluation system may be summarized as including: at least one processor; and at least one nontransitory processor-readable medium communicatively coupled to the at least one processor that stores at least one of processor-executable instructions or data that when executed by the at least one processor cause the at least one processor to: derive a set of user interest groups from a plurality of user interests specified by a plurality of users as freeform text, where the number of interest groups in the set of user interest groups is less than a total number of user interests in the plurality of user interests specified by the plurality of users; for each of a number of the users, determine a respective interest group membership vector based on respective user interests specified by the respective user the interest group membership vector having one or more elements which represent a partial membership in respective ones of one or more of the interest groups; and assess at least one of the users based at least in part on at least one of the interest group membership vectors.

The processor-executable instructions that cause the at least one processor to assess at least one of the users based at least in part on at least one of the interest group membership vectors may further cause the at least one processor to: compare a respective interest group membership vector for a first one of the users with the respective interest group membership vector for at least one other one of the users. The processor-executable instructions that cause the at least one processor to compare the respective interest group membership vector for a first one of the users with the respective interest group membership vector for at least one other one of the users may further cause the at least one processor to: determine a distance between the respective interest group membership vector for the first one of the users and the respective interest group membership vector for the at least one other one of the users. The processor-executable instructions that cause the at least one processor to compare a respective interest group membership vector for a first one of the users with the respective interest group membership vector for at least one other one of the users may further cause the at least one processor to: determine a similarity between the respective interest group membership vector for the first one of the users and the respective interest group membership vector for the at least one other one of the users. The processor-executable instructions may further cause the at least one processor to: normalize the respective interest group membership vector for at least one of the interest group membership vectors; and wherein the processor-executable instructions that cause the at least one processor to assess at least one of the users based at least in part on at least one of the interest group membership vectors may further cause the at least one processor to: assess at least a first one of the users based at least in part on the normalized respective interest group membership vector for the first one of the users. The processor-executable instructions that cause the at least one processor to determine a respective interest group membership vector based on respective user interests specified by the respective user may further cause the at least one processor to: determine a respective interest group membership vector for each active user associated with a first defined language or first defined dialect of a language. The processor-executable instructions may further cause the at least one processor to: receive the plurality of user interests specified by the plurality of users as freeform text; and preprocess the received plurality of user interests specified by the plurality of users as freeform text. The processor-executable instructions that cause the at least one processor to preprocess the received plurality of user interests specified by the plurality of users as freeform text may further cause the at least one processor to at least one of: remove characters that are not valid letters in a valid language from the received plurality of user interests specified by the plurality of users as freeform text; remove stop words from the received plurality of user interests specified by the plurality of users as freeform text; or perform stemming on the received plurality of user interests specified by the plurality of users as freeform text. The processor-executable instructions that cause the at least one processor to derive a set of user interest groups from a plurality of user interests specified by a plurality of users as freeform text may further cause the at least one processor to: derive the set of interest groups from the preprocessed plurality of user interests specified by the plurality of users, which user interests may include at least one incorrect spelling of a user interest, and at least one pair of alternative names for a given user interest. The processor-executable instructions that cause the at least one processor to derive a set of user interest groups from a plurality of user interests specified by a plurality of users as freeform text may further cause the at least one processor to: generate a generative natural language processing model based at least in part on the plurality of user interests specified by the plurality of users as freeform text. The processor-executable instructions that cause the at least one processor to generate a generative natural language processing model may further cause the at least one processor to: perform a Latent Dirichlet Allocation on preprocessed user interests specified by the plurality of users as freeform text. The processor-executable instructions that cause the at least one processor to derive a set of user interest groups from a plurality of user interests specified by a plurality of users as freeform text may further cause the at least one processor to: compute for a number of interest words, provided by each of the users provides a respective set of user interest words in freeform text, a respective interest word frequency-inverse set of user interest words frequency. The processor-executable instructions may further cause the at least one processor to: receive a set of self-specified user interests provided by a first one of the users, and wherein assessing at least one of the users based at least in part on at least one of the interest group membership vectors may include assessing potential matches with other ones of the users based on an assessment in commonality or differences between the respective interest group membership vector of the first one of the users and respective interest group membership vectors of the other ones of the users. The processor-executable instructions may further cause the at least one processor to: receive a set of user interests desired by a first one of the users in another one of the users; generate a hypothetical interest group membership vector based on the received set of user interests desired by the first one of the users in another one of the users, and wherein assessing at least one of the users based at least in part on at least one of the interest group membership vectors may include assessing potential matches with other ones of the users based on an assessment in commonality or differences between the hypothetical interest group membership vector and respective interest group membership vectors of the other ones of the users. The processor-executable instructions may further cause the at least one processor to: receive an identification of one user by a first one of the users, and wherein assessing at least one of the users based at least in part on at least one of the interest group membership vectors may include assessing potential matches with other ones of the users based on an assessment in commonality or differences between a respective interest group membership vector of the identified one of the users and respective interest group membership vectors of other ones of the users. The processor-executable instructions that cause the at least one processor to receive an identification of one user by a first one of the users may further cause the at least one processor to: receive identification of at least one user who has at least one trait, other than user interests, which disqualifies the respective at least one user as a match for the first one of the users. The processor-executable instructions may further cause the at least one processor to: detect an interest in one user by a first one of the users, and wherein assessing at least one of the users based at least in part on at least one of the interest group membership vectors may include assessing potential matches with other ones of the users based on an assessment in commonality or differences between a respective interest group membership vector of the one of the users in which the interest was detected and respective interest group membership vectors of other ones of the users. The processor-executable instructions may further cause the at least one processor to: select by the at least one processor a first subset of the users based on traits other than user interests, and wherein assessing at least one of the users based at least in part on at least one of the interest group membership vectors may include assessing a compatibility of the users of the first subset of users with a first one of the users based on a respective interest group membership vector for the first one of the users with the respective interest group membership vector for the other one of the users in the first subset of the users. The processor-executable instructions may further cause the at least one processor to: determine by the at least one processor at least one hypothetical interest group membership vector based on the respective interest group membership vectors of a plurality of the users, and wherein assessing at least one of the users based at least in part on at least one of the interest group membership vectors may include comparing a respective interest group membership vector for a first user with the at least one hypothetical interest group membership vector. The processor-executable instructions that cause the at least one processor to determine at least one hypothetical interest group membership vector based on the respective interest group membership vectors of a plurality of the users may further cause the at least one processor to: determine at least one of a mean or median of the respective interest group membership vectors of the set of users. The processor-executable instructions that cause the at least one processor to determine at least one hypothetical interest group membership vector based on the respective interest group membership vectors of a plurality of the users may further cause the at least one processor to: determine the at least one hypothetical interest group membership vector based on the respective interest group membership vectors of a set of users that each have at least two demographic attributes in common. The processor-executable instructions that cause the at least one processor to determine at least one hypothetical interest group membership vector based on the respective interest group membership vectors of a plurality of the users may further cause the at least one processor to: determine the at least one hypothetical interest group membership vector based on the respective interest group membership vectors of a set of users that each have a geographic locale in common. The processor-executable instructions may further cause the at least one processor to: determine a relative distance between the respective interest group membership vector of the first user and the at least one hypothetical interest group membership vector; and provide an indication of the determined relative distance. The processor-executable instructions may further cause the at least one processor to: identify at least one other set of users with which the first user is more compatible based on the respective interest group membership vector of the first user and at least one hypothetical interest group membership vector of the at least one other set of users; and provide an indication of the determined other set of users with which the first user is more compatible. The processor-executable instructions may further cause the at least one processor to: select the set of users based on at least a first characteristic that is common to the users of the first set; and select the at least one other set of users based on at least a second characteristic that is common to the users of the second set and not common to the users of the first set. The processor-executable instructions may further cause the at least one processor to: select the set of users based on at least a first geographical locale that is common to the users of the first set; and select the at least one other set of users based on at least a second geographic locale that is common to the users of the second set and not common to the users of the first set.

The processor-executable instructions further cause the at least one processor to: select a first subset of the users based on traits other than user interests; wherein the processor-executable instructions that cause the at least one processor to assess at least one of the users based at least in part on at least one of the interest group membership vectors, further cause the at least one processor to: assess a dissimilarity of the users of the first subset of users with a first one of the users based on a respective interest group membership vector for the first one of the users with the respective interest group membership vector for the other one of the users in the first subset of the users. The processor-executable instructions further cause the at least one processor to: determine at least one hypothetical interest group membership vector based on the respective interest group membership vectors of a plurality of the users; and wherein the processor-executable instructions that cause the at least one processor to assess at least one of the users based at least in part on at least one of the interest group membership vectors, further cause the at least one processor to: display at least one interest-based characteristic of the group identified at least in part via the hypothetical interest group membership vector.

The processor-executable instructions further cause the at least one processor to: determine a first hypothetical interest group membership vector based on the respective interest group membership vectors of a first plurality of the users; determine a second hypothetical interest group membership vector based on the respective interest group membership vectors of a second plurality of the users; and wherein the processor-executable instructions that cause the at least one processor to assess at least one of the users based at least in part on at least one of the interest group membership vectors, further cause the at least one processor to: assess at least one of a similarity or a dissimilarity between the first plurality of the users the second plurality of the users by comparing the first hypothetical interest group membership vector with the second hypothetical group membership vector.

The processor-executable instructions further cause the at least one processor to: determine the first hypothetical interest group membership vector based on the respective interest group membership vectors of the first plurality of the users who share at least a first non-interest based profile attribute; determine a second hypothetical interest group membership vector based on the respective interest group membership vectors of the second plurality of the users who share at least a second non-interest based profile attribute that is different than the first non-interest based profile attribute; and wherein the processor-executable instructions that cause the at least one processor to assess at least one of the users based at least in part on at least one of the interest group membership vectors, further cause the at least one processor to: assess the interests of the first plurality of the users as provided by the first hypothetical interest group membership vector with the interests of the second plurality of the users as provided by the second hypothetical group membership vector.

The processor-executable instructions that cause the at least one processor to determine the first hypothetical interest group membership vector based on the respective interest group membership vectors of the first plurality of the users who share at least a first non-interest based trait and a second non-interest based trait, further cause the at least one processor to; determine the first hypothetical interest group membership vector based on the respective interest group membership vectors of the first plurality of the users who share at least a first non-interest based trait that includes a defined first geographic location; and wherein the processor-executable instructions that cause the at least one processor to determine by the at least one processor the second hypothetical interest group membership vector based on the respective interest group membership vectors of the second plurality of the users who share at least the second non-interest based trait further cause the at least one processor to; determine the second hypothetical interest group membership vector based on the respective interest group membership vectors of the second plurality of the users who share at least the second non-interest based trait that includes a defined second geographic location.

The processor-executable instructions that cause the at least one processor to determine by the at least one processor the first hypothetical interest group membership vector based on the respective interest group membership vectors of the first plurality of the users who share at least a first non-interest based trait and a second non-interest based trait further cause the at least one processor to determine by the at least one processor the first hypothetical interest group membership vector based on the respective interest group membership vectors of the first plurality of the users who share at least a first non-interest based trait that includes a defined first geographic location and a third non-interest based trait; and wherein the processor-executable instructions that cause the at least one processor to determine the second hypothetical interest group membership vector based on the respective interest group membership vectors of the second plurality of the users who share at least the second non-interest based trait and a third non-interest based trait, further cause the at least one processor to: determine the second hypothetical interest group membership vector based on the respective interest group membership vectors of the second plurality of the users who share at least the second non-interest based trait that includes a defined second geographic location and the third non-interest based trait.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. Operational level details, programming, and statistical underpinnings of Latent Dirichlet Allocation ("LDA") and other similar generative natural language processing models are well understood by those of skill in the relevant arts and are readily accessible and will not be addressed in depth, described or shown in detail herein to avoid obscuring the presented embodiments. Additionally, construction, specification and operational level details of standard electronic components such as processors, nontransitory storage media and/or devices, input/output interfaces, and wired and wireless networking are also known to those of skill in the relevant arts and are also neither described nor shown in detail herein.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used herein users referred to by the descriptive terms "match," "matches," "potential candidate," "potential candidates," "potential candidate match," and "potential candidate matches" collectively refer to a set of users that includes any number of users having user interest group membership vectors that fall within a defined acceptable range, distance, or other measurement attribute of a defined user interest group membership vector.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
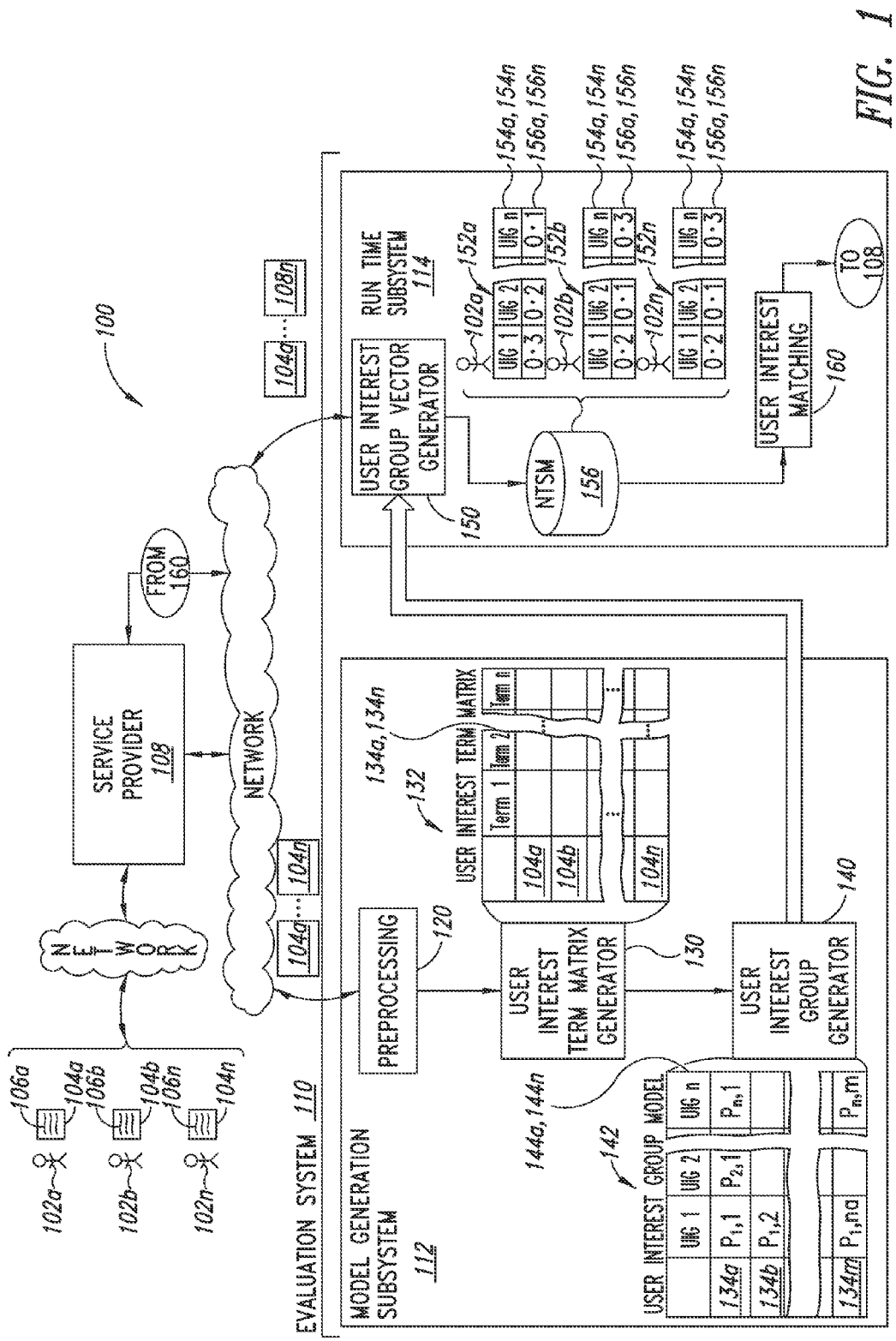
FIG. 1 is a schematic view of a user evaluation environment that includes an evaluation system useful for generating user interest group membership vectors for each user in a number of users and evaluating pairings between two or more users in the number of users using the user interest group membership vectors, according to one illustrated embodiment.

FIG. 1 shows an evaluation system environment 100 in which evaluation system 110 that includes a model generation subsystem 112 and a run-time subsystem 114 receives user profile data 104a-104n (collectively "profile data 104" from a respective number of users 102a-102n (collectively, "users 102"). In some implementations, the number of users 102a-102n may include an entire user population. In other instances, the number of users 102a-102n may include a subset of users manually or autonomously selected from a larger user population. For example, the number of users 102a-102n may include a subset of potential or candidate matches chosen by the service provider 108 using one or more non-interest based matching criteria (e.g., gender, orientation, geographic location, age, income, education, and the like).

The model generation subsystem 112 receives the user profile data 104a-104n and uses freeform text 106a-106n present in the user profiles to generate a user interest group model 142. The run-time system 114 receives the user interest group model 142 and, using the freeform text 106a-106n included in the user profiles 104a-104n, determines a respective user interest group membership vector 152 for each of the users 102a-102n. The run-time system 114 uses the user interest group membership vectors 152a-152n to identify potential or candidate user matches within the number of users 102a-102n. The service provider 108 can communicate the potential or candidate matches to each of the respective users 102a-102n.

Within the model generation subsystem 112, freeform text 106 provided by a user 102 in the profile data 104 is preprocessed using one or more preprocessing modules 120. At least a portion of the freeform text provided by the user 102 may include information indicative of the user's personal interests and/or interests that the user 102 would find desirable in a partner.

At least a portion of the preprocessed freeform text 106 is forwarded to a user interest term matrix generator module 130. The user interest term matrix generator module 130 generates a user interest term matrix 132. The user interest term matrix 132 shows a distribution or frequency of appearance of words or terms 134a-134m (collectively "terms 134") used within all or a portion of the freeform text 106 included in each of the use profiles 104a-104n.

Some or all of the data included in the user interest term matrix 132 is provided to the user interest group generation module 140. Using a natural language generative model such as Latent Dirichlet Allocation, the user interest group generation module 140 produces a user interest group model 142. The user interest group model 142 includes a defined number of user interest groups 144a-144n (collectively "user interest groups 144"), each of which includes a number of words 146a-146n (collectively, "words 146") logically associated with the respective user interest group 144. The words 146 associated with a particular user interest group 144 may have a logically associated value indicative of the degree or strength of the association between the respective word 146 and the user interest group 144.

Some or all of the data included in the user interest group model 142 is provided to the user interest analysis module 150. Based on the freeform text 106a-106n included in each user's profile 104a-104n, the user interest analysis module 150 generates a respective user interest group membership vector 152a-152n for each user 102a-102n. The user interest group membership vector 152 includes a number of components, values, or elements 156a-156n (collectively, "elements 156"), each of which corresponds to one of the number of user interest groups 144a-144n. Thus, each user 102 is associated by the evaluation system 110 with a respective user interest group membership vector 152 that characterizes the interests of the user 102 in each of the user interest groups 144 as a value indicative of the strength of the respective user's interest in the particular user interest group 144.

The user interest group membership vector 152 is provided to the user interest matching module 160. Based on the values in a particular user's 102 user interest group membership vector 152, candidate matches for the particular user 102 are determined based upon a degree of similarity and/or a degree of difference between the user's user interest group membership vector 152 and the candidate matching user's user interest group membership vector 152.

Although the evaluation system 110 will be discussed in the form of subsystems 112, 114 each containing a number of discrete "modules" 120, 130, 140, 150, 160 for clarity and ease of discussion, those of skill in the relevant arts will readily appreciate that any number of subsystems and/or modules may be embodied in any number of processors and/or computing devices. Thus all of the discussed modules may be incorporated into processor-executable code executed by a single computing device. Additionally, the above evaluation system 110 will be discussed in terms of an illustrative relationship building or "dating" Website. Those of ordinary skill in the relevant arts will readily appreciate the applicability of such evaluation systems 110 in providing matches between parties in different circumstances such as, supplier/consumer, employer/employee, and others.

Relationship building Websites typically require new users 102 to register and generate a user profile 104 that is stored by the service provider and used to locate potential matches from among other registered users of the Website. At times, users 102 will generate profiles 104 that include freeform text 106. Such freeform text may be used to provide information or data to the service provider that is not easily, conveniently, or accurately reducible to binary selection criteria such as check-boxes or radio buttons. The information contained in such freeform text 106 is usually indicative of the interests, activities, or other information characteristic of the user 102, at times on multiple levels. For example, the literal terms provided by the user as freeform text each provide insight into the respective user's interests. On a deeper level, the relationship between the words provides a conceptual fabric underpinning the respective user's interest or interests.

In one example, a list of words included in freeform text 106a-106n provided by users 102a-102n may include a number of terms having similar or identical meanings such as "sail," "sailing," "boating," and "cruising" all of which are descriptive of an interest in an activity involving watercraft. In another example, a list of words included in freeform text 106 provided by a first user 102a may include "hunting," "fishing," and "camping," which may be considered as generally indicating the first user's interest in back-country outdoor activities. A list of words included in freeform text 106 provided by a second user 102b may include "hiking," "spelunking," and "rock climbing," which may be considered as generally indicating the second user's interest in back-country outdoor activities. In the absence of a common word or phrase appearing in the freeform text provided by each user, many matching or pairing algorithms would fail to recognize the potential matching of the first user with the second user based on their mutual interests in back-country outdoor activities. The use of an evaluation system 110 capable of generating user interest group membership vectors 152 including values associated with defined number of user interest groups 144 has been found to advantageously recognize such candidate pairings even in the absence of common terms, or in the presence of misspelled terms and/or idiomatic differences in a common language. By recognizing such, heretofore unrecognized, pairings within a large number of users 102a-102n, the quality of service provided by the service provider is improved and the perceived value to users is increased commensurately.

At least the freeform text 106 provided by each user 102a-102n in their respective, logically associated, user profile 104a-104n is communicated from the service provider's host Website 108 to the evaluation system 110, for example via one or more networks 109. In some instances, within the evaluation system 110, the preprocessing module 120 optionally receives at least a portion of the freeform text 106a-106n from at least some of the user profiles 104a-104n.

The preprocessing module 120 alters and/or edits the freeform text 106 provided by the users 102 preparatory to generating the user interest term matrix 132. In some instances, such alteration and/or editing of the freeform text 106 has been found to improve the overall performance of the user interest group model generator 140. The preprocessing module 120 removes non-letter characters from the freeform text 106. The preprocessing module 120 also removes "stop words" from the freeform text 106. Stop words include words such as "a," "the," "I," "me," and others that provide no indication of a user interest and are included in a defined dictionary.

In some implementations, the preprocessing module 120 may also optionally stem the words in the freeform text 106. Such stemming may be performed using a Porter stemmer. An example Porter stemmer is described in detail in the "The Porter Stemming Algorithm: Then and Now" (Willett, P. (2006) The Porter stemming algorithm: then and now. Program: electronic library and information systems, 40 (3). pp. 219-223) which to the extent it is not contradictory to the information contained herein is incorporated by reference as if reproduced in its entirety herein. A word stemmer stems different variations of a word back to a single word stem, for example "movie" and "movies" would both be stemmed to "movi." A word stemmer thus serves to reduce the number of words included in a vocabulary without reducing the overall richness or variety of concepts conveyed by the words included in the vocabulary.

The preprocessing module 120 then computes the term frequency-inverse document frequency (tf-idf) for each of the words included in the freeform text 106 of the user profiles 104a-104n. The tf-idf is given by:

$$tf(t,d) \times idf(t,D) \qquad (1)$$

Where: tf(t,d)=1 if the word t appears in document d, 0 otherwise; and $$idf(t, D) = \log \frac{N}{|\{d \in D : t \in d\}|} \qquad (2)$$

Where: N=total number of user profiles
D=number of documents in which word t appears The preprocessing module 120 then discards those words included in the freeform text 106a-106n having a tf-idf value below a defined threshold. Words having a tf-idf value below a defined threshold appear in a high percentage of the freeform text 106a-106n provided by the users 102a-102n. The ubiquity of such words in the freeform text 106 tends to provide limited information gain, thus the elimination of such words generally reduces system overhead requirements and improves the quality of user interest group determination. After determining the tf-idf for each word, blank user profiles 104 (i.e., those user profiles 104 having a freeform text entry in which every word has been discarded based on the tf-idf) are discarded.

The edited freeform text 106 is passed from the preprocessing module 120 to the user interest term matrix generator module 130. The user interest term matrix generator module 130 generates a user interest term matrix 132 that indicates the frequency or mere occurrence of use of words 134a-134m in the freeform text 106a-106n portions of some or all of the user profiles 104a-104n.

The user interest term matrix 132 is passed from the user interest term matrix generator module 130 to the user interest group generator module 140. The user interest group generator module 140 employs a generative Natural Language Processing (NLP) model using a hierarchical Bayesian inference to discover latent similarities between passages of freeform text 106a-106n included in any number of user profiles 104a-104n. In at least some instances, the generative NLP model includes Latent Dirichlet Allocation ("LDA") although other generative NLP models may be substituted. The generative NLP model discovers relations between passages of freeform text 106a-106n and clusters such relations into a defined number of user interest groups 144a-144n. Advantageously, the relationships discovered by the NLP model are not defined but instead are organic to the freeform text 106a-106n provided by the users 102a-102n.

Figure 2:
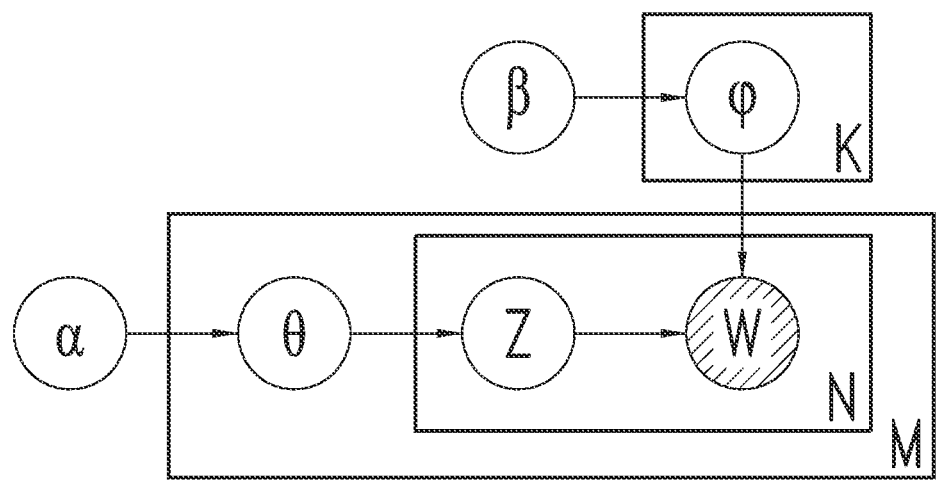
FIG. 2 is a plate diagram of an example method of generating a user interest topic schema using a generative Natural Language Processing (NLP) method, according to FIG. 3 is a functional block diagram of an evaluation system that matches two or more users in a number of users based on their respective user interest group membership vectors, according to one illustrated embodiment.

The user interest group model 142 is determined based at least in part on the, the vocabulary ("V") of words 134a-134m, the set ("M") of freeform text 106a-106n, and a defined number ("K") of user interest groups 144a-144n. Using a LDA model as an illustrative example, let:
α=vector parameter of the Dirichlet prior on the per-document user interest group distribution β=vector parameter of the Dirichlet prior on the per-user interest group word distribution
$\theta_i$=user interest group distribution for document i
$\phi_k$=word distribution for topic k
$z_{ij}$=user interest group for the $j^{th}$ word in document i
$w_{ij}$=specific $j^{th}$ word in document i The user interest group generator module 140 attempts to infer both the defined number of user interest groups 144a-144n ($\theta_i$) and the word 134a-134m distribution with each of the defined number of user interest groups 144a-144n ($\phi_k$). With reference to the plate notation graphical model depicted in FIG. 2, the total probability may be expressed as:

$$p(\vec{w},\vec{z},\vec{\theta},\vec{\phi},\alpha,\beta)=\Pi_{i=1}^{K}p(\phi_i,\beta)\Pi_{j=1}^{M}p(\theta_j,\alpha)\Pi_{t=1}^{N_j}p(z_{j,t}|\theta_j)p(w_{j,t}|\phi Z_{j,t}) \quad (3)$$

Since the occurrence of words in the freeform text 106a-106n is known, the word 134a-134m distribution within the freeform text 106a-106n may be determined and the user interest group 144a-144n inferred using the following equation which may be referred to as the posterior distribution:

$$p(\vec{\theta},\vec{\phi},\vec{z}|\vec{w},\alpha,\beta)=\frac{p(\theta,\phi,z,w|\alpha,\beta)}{p(w|\alpha,\beta)} \quad (4)$$

The denominator of equation (4) is intractable to exact determination as it involves multiple integrals that are not separable or expressible in closed form. Consequently, approximation techniques such as Variational Expectation Maximization and Collapsed Gibbs Sampling may be used to approximate the value of the denominator in equation (4) and determine the probability value $p(\vec{\theta},\vec{\phi},\vec{z}|\vec{w},\alpha,\beta)$. The resultant value provides a probability that a particular word 134 is related to a particular user interest group 144. Each word 134a-134m extracted from the freeform text 106a-106n provided by users 102a-102n is similarly evaluated for each user interest group. The resultant user interest group model 142 is therefore an "M" word by "K" user interest group matrix of values indicative of a probability that the $m^{th}$ word is related to the $k^{th}$ user interest group.

The probability distribution is generally indicative of the relationship between the respective word 134 and the respective user interest group 144. Thus, the user interest group generator module 140 may determine words such as "ski," "snowboard," and "snowshoe" share a close relationship due to the frequency of their appearance together in the freeform text 106a-106n provided by users. In such an instance, the words "ski," "snowboard," and "snowshoe" may be associated with higher probability values in a first user interest group 144a that may be labeled "outdoor winter sports," and may be associated with significantly lower probability values in a second user interest group 144b that may be labeled "cooking."

The defined number of user interest groups 144a-144n is determined by the service provide based on empirical experience and observation. Too few user interest groups 144a-144n may result in an overly large number of marginal candidate user matches. For example, a "sports" user interest group may include every sport related word included in the freeform text 106a-106n provided by users 102a-102n. Such a broad interest group 144 would result in the essentially meaningless pairing of a user 102a who has indicated an interest in football with every other user who has indicated interests in golf, tennis, badminton, and volleyball. In contrast, a "badminton" user interest group 144 may result in a low number of very closely aligned candidate user matches between users who have included words such as "badminton" or "poona" in their freeform text 106 while ignoring other potentially sound candidate matches who have included words such as "tennis" and "table tennis" (i.e., related racquet/net sports) in their freeform text 106.

The language used in the freeform text 106a-106n provided by users 102a-102n will not remain static over time. As new words enter the vernacular and old words depart, the changes are reflected in the freeform text 106. To accommodate such linguistic changes, periodically, intermittently, or from time-to-time, the evaluation system 110 may pull or the service provider 108 may push some or all of the user profiles 104a-104n to the model generation subsystem 112. The model generation subsystem 112 will reprocess the freeform text 106 included in the user profiles in the manner discussed above to generate an updated user interest group model 142 for use by the run-time subsystem 114.

Advantageously, the user interest group generator module 140 accommodates the use of commonly misspelled words. For example, if the word "swimming" is frequently misspelled as "swiming" in freeform text 106, the presence of both words in accompaniment of other aquatic activities will result in both "swimming" and "swiming" being included in the words 134a-134n used in developing the user interest group model 142.

The user interest group model 142 is passed from the model generation subsystem 112 to the user interest group vector generation module 150 in the run-time subsystem 114. Using the user interest group model 142, the user interest group vector generation module 150 determines a user interest group membership vector 152a-152n for each user 102a-102n. Importantly, the user interest group membership vector 152 is determined for all users 102, including those users 102a-102n whose freeform text 106a-106n was used by the evaluation system 110 as a basis for developing the user interest group model 142 as well as new users whose freeform text 106 has not been previously handled by the evaluation system 110. The user interest group vector generation module 150 determines the user interest group membership vector 152a for a particular user 102a by ranking the words used in the freeform text 106a provided by the particular user 102a that are included in the vocabulary 134a-134m of the user interest group model 142. Further, the user interest group vector generation module 150 identifies the user interest groups 144a-144n in which the words included in the freeform text 106a are most likely to occur.

The user interest group membership vector 152 for each user is a set of elements between zero (0) and one (1) indicative of the partial membership in each topic. In other words, a user 102 is considered to have a total interest level of 100%, the individual components or elements 154a-154n that form the user interest group membership vector 152 are indicative of relative allocation of the user's interest in the user interest group based on the word provided by the respective user in the freeform text 106 portion of the respective user's profile 104. The user interest group membership vector 152 is therefore logically associable with a user 102 via the freeform text 106 provided by the respective user 102 which used to generate the respective user interest group membership vector 152.

The user interest group vector generation module 150 performs post processing on the user interest group membership vector 152. Usually the user interest group membership vector 152 for each user will include elements 154a-154n for each user interest group 144a-144n, with some of the values being quite small. To isolate the dominant topics, the user interest group vector generation module 150 may set at least a portion of the elements 154a-154n equal to a value of zero (0). In one implementation, elements 154a-154n having an associated value of less than 1/(number of user interest groups 144a-144n) are set to a value of zero.

The user interest group vector generation module 150 also normalizes each user interest group membership vector 152. In some implementations, the user interest group vector generation module 150 normalizes the element 154a-154n values by summing the element values and dividing each element value by the element value total (i.e., percentage normalization). In other implementations, the user interest group vector generation module 150 normalizes the user interest group membership vector 152 by converting the vector to unit length (i.e., unit normalization).

The user interest group vector generation module 150 then logically associates each of the user interest group membership vectors 152a-152n with a respective one of the users 102a-102n associated with the user profile 104a-104n containing the freeform text 106a-106n used to provide the respective user interest group membership vector 152a-152n. In some implementations, the user interest group membership vector 152 and data indicative of the logically associated user 102 are stored in one or more data storage structures (e.g., databases) retained on one or more nontransitory storage media 156.

Periodically, continuously, or from time-to-time, the service provider 108 may autonomously communicate and/or the user interest group vector generation module 150 may poll the service provider 108 to detect user profiles 104 associated with new users 102 or existing users who change their freeform text 106. The user profiles 104a-104n associated with new users 102 or with existing users 102 who have changed and/or edited their freeform text 106 are received by the user interest group vector generation module 150. Using the new and/or updated freeform text 106, the user interest group vector generation module 150 generates a new or updated user interest group membership vector 152 for the respective new or existing user.

During run-time operation, the user interest matching module 160 compares a first user interest group membership vector 152a with any number of second user interest group membership vectors 152b-152n to identify candidate matching users having interests compatible with the interests provided by the first user 102a. In some instances, the user interest matching module 160 identifies a candidate match by identifying a similarity between the user interest group membership vector 152a of the first user 102a and the user interest group membership vector 152b of a second user 102b. In such instances, the user interest matching module 160 may determine a cosine similarity via the following:

$$s(\vec{x}, \vec{y}) = \frac{\vec{x} \cdot \vec{y}}{\|\vec{x}\| \|\vec{y}\|} \quad (5)$$

Where: $\| \ \|$ denotes the norm, i.e., $\|\vec{x}\| = \sqrt{\vec{x} \cdot \vec{x}}$ Equation (5) provides a value ranging from 0 to 1 that is indicative of the cosine similarity between the two user interest group membership vectors 152a, 152b. Using equation (5), the greater the value, the greater the degree of similarity. Candidate matches may be identified as those users whose user interest group membership vector 152 provide a cosine similarity value greater than one or more defined threshold values or falling within one or more defined threshold ranges. Alternately, candidate matches may be identified as those users whose user interest group membership vector 152 provide a simple ranked list of values.

In other instances, the user interest matching module 160 identifies a candidate match by identifying a distance between the user interest group membership vector 152a of the first user 102a and the user interest group membership vector 152b of a second user 102b. In such instances, the user interest matching module 160 may determine a Euclidean distance via the following:

$$d(\vec{x}, \vec{y}) = \frac{\|\vec{x} - \vec{y}\|}{\|\vec{x}\| + \|\vec{y}\|} \quad (6)$$

Equation (6) provides a value indicative of the Euclidean distance between the two user interest group membership vectors 152a, 152b. Using equation (6), the smaller the value, the lesser the distance and the greater the degree of similarity between the two user interest group membership vectors 152a, 152b. Candidate matches may be identified as those users whose user interest group membership vector 152 provide a Euclidean distance value lesser than one or more defined threshold values or falling within one or more defined threshold ranges.

Other algorithms and methods may be employed by the user interest matching module 160 to determine the degree of similarity between two user interest group membership vectors 152 and consequently to identify candidate or potential matches. For example, in some implementations, one or more elements 154a-154n in the user interest group membership vector 152 may be weighted more heavily than others to increase the emphasis on the particular user interest group 144 associated with the weighted element 154 in identifying candidate or potential matches. In some implementations, one or more elements 154a-154n in the user interest group membership vector 152 may be discounted or weighted more lightly than others to decrease the emphasis on the particular user interest group 144 associated with the weighted element 154 in identifying candidate or potential matches.

The user interest matching module 160 ranks the candidate matches based on the determined value of similarity, distance, or other unit of measure between the user interest group membership vector 152a of a first user 102a and the user interest group membership vector 152b-152n of any number of other individual users or groups of users 102b-102n.

Figure 3:
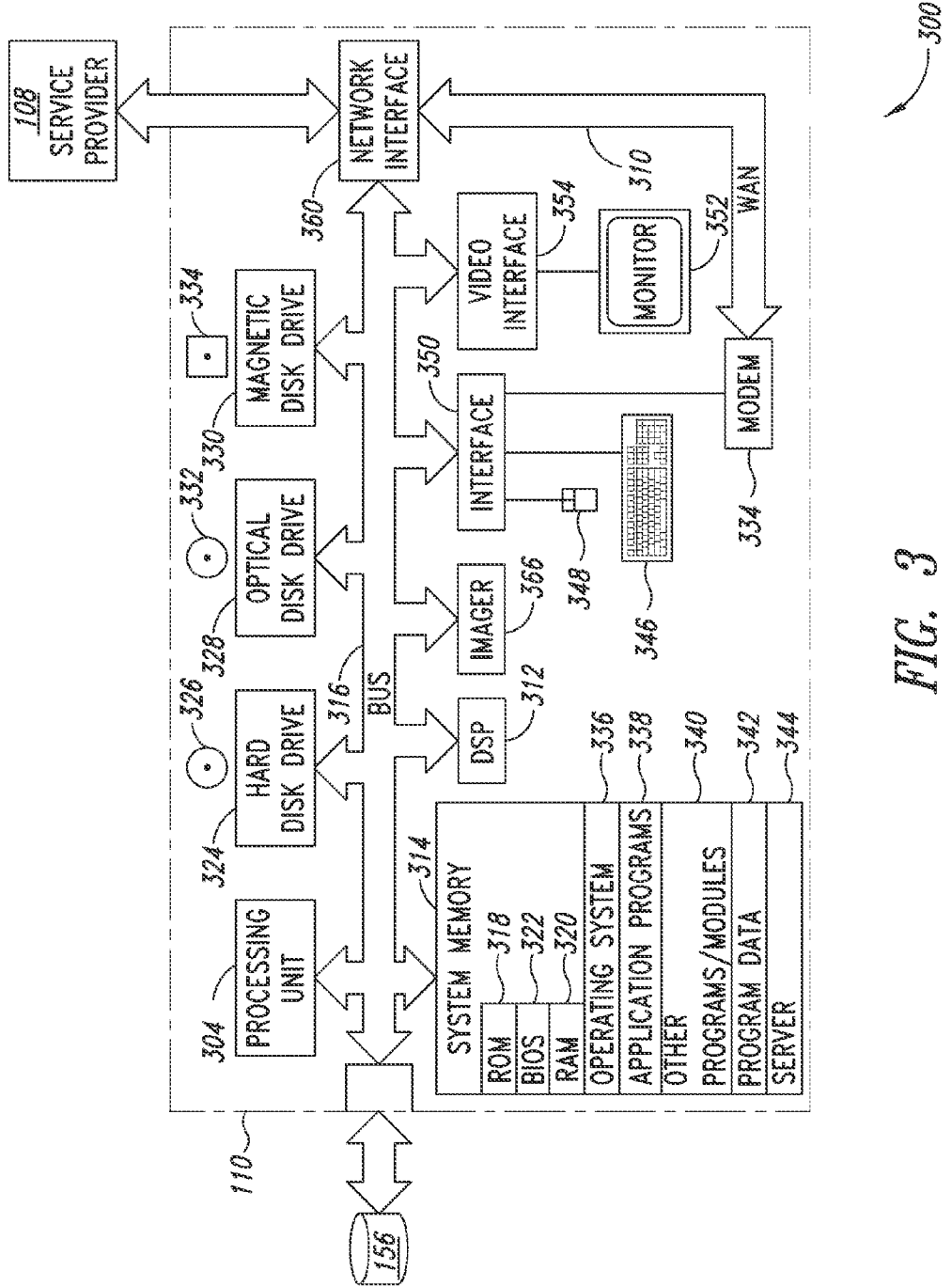

FIG. 3 shows an evaluation system environment 300 in which the model generation subsystem 112 and the run-time subsystem 114 are provided by a single system that includes one or more processing units 304 (only one illustrated) and one or more associated nontransitory machine-readable storage media 156 (only one illustrated). The associated nontransitory computer- or processor-readable storage media 156 is communicatively coupled to the evaluation system 110 via one or more communications channels, for example one or more parallel cables, serial cables, or wireless network channels capable of high speed communications, for instance via Universal Serial Bus ("USB") 3.0 or via Thunderbolt®.

Although the evaluation system 110 is described herein in the context of a standalone system, the evaluation system 110 may, in fact, constitute only a portion of a larger entity, for example a relationship building Website, Internet Service Provider (ISP) server, or similar entity. In such instances, components, sub-systems, and resources described forming all or a portion of the evaluation system 110 should be understood as components, subsystems, and resources that are shared with the relationship building Website or one or more common systems and/or resources that are allocated between the relationship building Website and the evaluation system 110.

The evaluation system environment 300 may employ other computer systems and network equipment, for example additional servers, cloud computing services, proxy servers, firewalls, routers and/or bridges. The evaluation system 110 will at times be referred to in the singular herein, but this is not intended to limit the embodiments to a single device since in typical embodiments there may be more than one evaluation system 110 used. Unless described otherwise, the construction and operation of the various system and/or component blocks shown in FIG. 3 are of conventional design. As a result, such system and/or component blocks need not be described in further detail herein, as they will be understood by those skilled in the relevant art(s).

The evaluation system 110 may include one or more processing units, logic circuits, and/or processors 304, a system memory 314 and a system bus 316 that couples various system components including the system memory 314 to the processors 304. The processors 304 may include any logic processing unit, such as one or more single or multi-core or processor microprocessors, central processing units (CPUs), digital signal processors (DSPs), application-specific integrated circuits (ASICs), field programmable gate arrays (FPGAs), etc. The system bus 316 can employ any known bus structures or architectures, including a memory bus with memory controller, a peripheral bus, and/or a local bus. The system memory 314 includes read-only memory ("ROM") 318 and random access memory ("RAM") 320. A basic input/output system ("BIOS") 322, which can form part of the ROM 318, contains basic routines that help transfer information between elements within the evaluation system 300, such as during start-up.

The evaluation system 110 may optionally include a hard disk drive 324 for reading from and writing to a hard disk 326, an optical disk drive 328 for reading from and writing to removable optical disks 332, and/or a magnetic disk drives 330 for reading from and writing to magnetic disks 334. The optical disk 332 can be a CD-ROM, while the magnetic disk 334 can be a magnetic floppy disk or diskette. The hard disk drive 324, optical disk drive 328 and magnetic disk drive 330 may communicate with the processors 304 via the system bus 316. The hard disk drive 324, optical disk drive 328 and magnetic disk drive 330 may include interfaces or controllers (not shown) coupled between such drives and the system bus 316, as is known by those skilled in the relevant art. The drives 324, 328 and 330, and their associated computer-readable media 326, 332, 334, provide nonvolatile storage of computer-readable instructions, data structures, program modules and other data used by the model generation subsystem 112 and the run-time subsystem 114 and/or the evaluation system 110. Although the evaluation system 110 is illustrated employing a hard disk 324, optical disk 328 and magnetic disk 330, those skilled in the relevant arts will appreciate that other types of processor-readable media that can store data accessible by the processors 304 may be employed. All or a portion of such storage may be local to the evaluation system 110 (i.e., local storage) or remote from the evaluation system 110 (i.e., network storage or "cloud"/Internet storage) and may include any type of current or future developed nontransitory storage media including atomic/quantum/molecular storage, electro-resistive storage, WORM drives, RAID drives, removable and/or non-removable flash memory cards, digital video disks ("DVD"), Bernoulli cartridges, RAMs, ROMs, smart cards, etc.

Program modules are stored at least in part in the system memory 314. Program modules may include processor-executable instruction sets, logic, and/or programming capable of causing the processors 304 to provide the evaluation system 110. Program modules may include processor-executable instruction sets such as an operating system 336, one or more application programs 338, other programs or modules 340 and program data 342.

The one or more application programs 338 may include one or more sets of logic or processor-readable instruction sets that cause the processor(s) 304 to provide or otherwise implement all or a portion of the preprocessing module 120, the user interest term matrix generation module 130, the user interest group generation module 140, the user interest group vector generation module 150, and the user interest matching module 160.

One or more application programs 338 may implement all or a portion of the preprocessing module 120. Such application programs 338 may remove non-letter characters and stopwords from the freeform text 106a-106n as described with regard to FIG. 1. In some implementations, such application programs 338 may stem all or a portion of the words included in the freeform text 106a-106n, using a technique such as Porter stemming as described with regard to FIG. 1. In some implementations, such application programs 338 may determine the term frequency-inverse document frequency (tf-idf) for each of the words included in the freeform text 106a-106n of the user profiles 104a-104n, using a technique such as described with regard to FIG. 1.

One or more application programs 338 may implement all or a portion of the user interest term matrix generation module 130. Such application programs 338 may generate a user interest term matrix 132 that indicates the frequency of use of words 134a-134m in the freeform text 106a-106n portions of some or all of the user profiles 104a-104n, using a technique such as described with regard to FIG. 1.

One or more application programs 338 may implement all or a portion of the user interest group generation module 140. Such application programs may accept an input indicative of a defined number of user interest groups 144a-144n, and then generate a user interest group model 142 in which a probability value for all of the words included in the user interest term matrix 132 are determined for each of the user interest groups 144a-144n, using a technique such as described with regard to FIG. 1.

In some instances, the user interest group model 142 may be generated using a generative Natural Language Processing (NLP) model. In some instances, the NLP model may use a hierarchical Bayesian influence to discover latent similarities between the various freeform text entries 106a-106n of the users 102a-102n. In at least one implementation the NLP model may include Latent Dirichlet Allocation (LDA). In some implementations, the application programs 338 may include one or more optimization routines to autonomously determine an optimal number of defined user interest groups 144a-144n, for example using an internal or external trained machine learning system.

One or more application programs 338 may implement all or a portion of the user interest group vector generation module 150. Such application programs may use the user interest group model 142 to generate user interest group membership vectors 152a-152n, post-process the generated user interest group membership vectors 152a-152n, and logically associate each of the user interest group membership vectors 152 with a respective one of the users 102a-102n, using techniques such as those described with regard to FIG. 1.

One or more application programs 338 may implement all or a portion of the user interest matching module 160, using techniques such as those described with regard to FIG. 1. Such user matching may include autonomously identifying potential or candidate matches including users 102 and/or groups of users 102a-102n based on a user interest group membership vector 152a associated with a particular user 102a.

One or more application programs 338 may cause the model generation subsystem 112 of the evaluation system 110 to autonomously, periodically, intermittently, or from time-to-time, receive user profiles 104a-104n from the service provider 108. Such enables the model generation subsystem 112 to autonomously update the user interest group model 142 provided by the user interest group generation module 140. Updating the user interest group model 142 beneficially incorporates the evolution of user vernacular as evidenced by the freeform text 106a-106n provided by users 102a-102n into the evaluation system 110.

One or more application programs 338 may cause the run-time subsystem 114 of the evaluation system 110 to autonomously, periodically, intermittently, or from time-to-time, receive user profiles 104a-104n from the service provider 108. Such beneficially enables the run-time subsystem 114 to autonomously update the user interest group membership vectors 152a-152n for existing users 102a-102n as well as add new user interest group membership vectors 152 for new users 102.

While shown in FIG. 3 as being stored in the system memory 314, the operating system 336, application programs 338, other programs/modules 340, program data 342 and browser 344 can be stored on the hard disk 326 of the hard disk drive 324, the optical disk 332 of the optical disk drive 328 and/or the magnetic disk 334 of the magnetic disk drive 330.

An evaluation system operator and/or a service provider 108 can enter commands and information into the evaluation system 110 using one or more input devices such as a touch screen or keyboard 346 and/or a pointing device such as a mouse 348, and/or via a graphical user interface. Other input devices can include a microphone, joystick, game pad, tablet, scanner, etc. These and other input devices are connected to the processor(s) 304 through an interface 350 such as a serial port interface that couples to the system bus 316, although other interfaces such as a parallel port, a game port or a wireless interface or a universal serial bus ("USB") can be used. A monitor 352 or other display device is coupled to the system bus 316 via a video interface 354, such as a video adapter. The evaluation system 110 can include other output devices, such as speakers, printers, etc.

Figure 4:
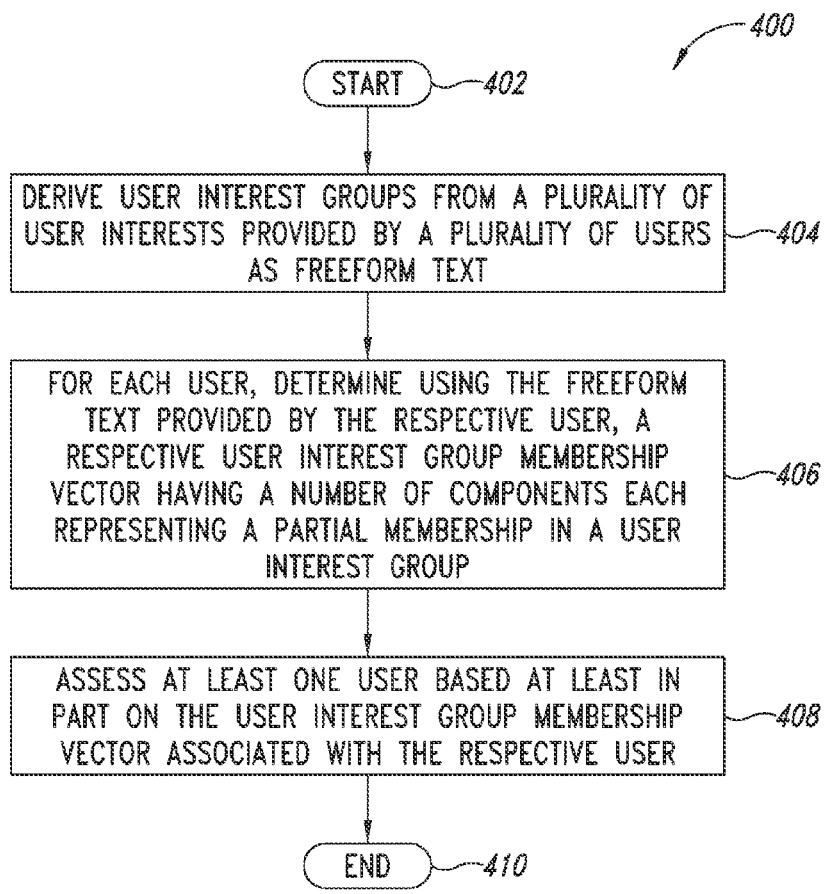
FIG. 4 is a flow diagram showing a high-level method of forming user interest groups using freeform text supplied by a number of users, generating user interest group membership vectors for each of the number of users, and assessing users via the user interest group membership vector, according to one illustrated embodiment.

FIG. 4 shows a high-level method 400 of generating user interest group membership vectors 152 and using the generated user interest group membership vectors 152 to identify candidate or prospective user matches within a number of users 102a-102n, according to one illustrated embodiment. Each user 102a-102n provides a respective user profile 104a-104n as part of a "sign-up" and/or registration process with a service provider 108. Each of the user profiles 104a-104n includes a respective freeform text entry 106a-106n. The words selected by the user 102 for inclusion in their freeform text 106 provide significant insight into the user's interests that transcends mere words. Considered together, the words selected by the user 102 can provide insight into larger concepts and interests useful for selecting candidate or prospective matches from a number of users 102a-102n. The method 400 of analyzing the freeform text 106a-106n provided by the users 102a-102n, generating user interest groups 144a-144n, and generating user interest group membership vectors 152a-152n useful for identifying candidate or potential matches in a number of users 102a-102n commences at 402.

At 404, the model generation subsystem 112 derives a defined number of user interest groups 144a-144n from a plurality of user interests provided by a plurality of users 102a-102n in the form of freeform text 106a-106n.

In some implementations, the model generation subsystem 112 forms words 134a-134m extracted from the freeform text 106a-106n into a user interest term matrix 132. The user interest term matrix 132 is used by the user interest group generation module 140 to generate the user interest group model 142. The user interest group model 142 matrix provides a probability value for each word 134a-134m in each of the defined number of user interest groups 144a-144n. The probability value associated with a particular word 134a in a particular user interest group 144a is indicative of the relationship between the word 134a and the respective user interest group 144a.

The user interest group generator module 140 employs a generative Natural Language Processing (NLP) model using a hierarchical Bayesian inference to discover latent similarities between passages of freeform text 106a-106n included in any number of user profiles 104a-104n. In at least some instances, the generative NLP model includes Latent Dirichlet Allocation ("LDA") although other generative NLP models may be substituted. The generative NLP model discovers relationships between passages of freeform text 106a-106n and clusters such relations into a defined number of user interest groups 144a-144n. Advantageously, the relationships discovered by the NLP model are not defined but instead are organic to the freeform text 106a-106n provided by the users 102a-102n.

The user interest group model 142 is determined based at least in part on the, the vocabulary ("V") of words 134a-134m, the set ("M") of freeform text 106a-106n, and a defined number ("K") of user interest groups 144a-144n. Using a LDA model as an illustrative example, let:

α=vector parameter of the Dirichlet prior on the per-document user interest group distribution β=vector parameter of the Dirichlet prior on the per-user interest group word distribution $\theta_i$=user interest group distribution for document i $\phi_k$=word distribution for topic k $z_{ij}$=user interest group for the $j^{th}$ word in document i $w_{ij}$=specific $j^{th}$ word in document i The user interest group generator module 140 attempts to infer both the defined number of user interest groups 144a-144n ($\theta_i$) and the word 134a-134m distribution with each of the defined number of user interest groups 144a-144n ($\phi_k$). With reference to the plate notation graphical model depicted in FIG. 2, the total probability may be expressed as:

$$p(\vec{w}, \vec{z}, \vec{\theta}, \vec{\phi}, \alpha, \beta) = \Pi_{i=1}^{K} p(\phi_i, \beta) \Pi_{j=1}^{M} p(\theta_j, \alpha) \Pi_{t=1}^{N_j} p(z_{j,t}|\theta_j) p(w_{j,t}|\phi Z_{j,t}) \quad (7)$$

Since the occurrence of words in the freeform text 106a-106n is known, the word 134a-134m distribution within the freeform text 106a-106n may be determined and the user interest group 144*a*-144*n* inferred using the following equation which may be referred to as the posterior distribution:

$$p(\vec{\theta}, \vec{\phi}, \vec{z} \mid \vec{w}, \alpha, \beta) = \frac{p(\theta, \phi, z, w \mid \alpha, \beta)}{p(w \mid \alpha, \beta)} \quad (8)$$

The denominator of equation (4) is intractable to exact determination as it involves multiple integrals that are not separable or expressible in closed form. Consequently, approximation techniques such as Variational Expectation Maximization and Collapsed Gibbs Sampling may be used to approximate the value of the denominator in equation (8) and determine the probability value $p(\vec{\theta}, \vec{\phi}, \vec{z} \mid \vec{w}, \alpha, \beta)$. The resultant value provides a probability that a particular word 134 is related to a particular user interest group 144. Each word 134*a*-134*m* extracted from the freeform text 106*a*-106*n* provided by users 102*a*-102*n* is similarly evaluated for each user interest group.

The model generation subsystem 112 generates the user interest group model 142 using freeform text 106*a*-106*n* provided by users 102*a*-102*n*. Advantageously, the model generation subsystem 112 may thus generate a user interest group model 142 using any defined language or any defined dialect of a language to reflect local usage or idioms. Additionally, since the model generation subsystem 112 uses both words 134*a*-134*n* and the relationship or logical grouping of words 134*a*-134*n* within the freeform text 106*a*-106*n* to determine user interest groups 144*a*-144*n*, commonly misspelled words and alternative words are ranked appropriately within each of the interest groups 144 based on their appearance with other related concepts. Thus, for example, if the term "snowboarding" is commonly misspelled as "sno-boarding" the presence of either term in conjunction with other winter sports would result in a relatively high ranking for both terms in the user interest group 144 that is associated with winter sports.

At 406, the user interest group vector generation module 150 receives the user interest term matrix 132 and determines for each user 102*a*-102*n* a respective user interest group membership vector 152*a*-152*n*. The user interest group membership vector 152 includes "n" elements 154*a*-154*n*, each element includes a value indicative of the strength of the user's interest in the respective user interest group 144*a*-144*n*.

Since the user interest group vector generation module 150 generates the user interest group membership vectors 152*a*-152*n* using the user interest group model 142, the user interest group vector generation module 150 can generate user interest group membership vectors 152*a*-152*n* using any defined language or any defined dialect of a language to reflect local usage or idioms.

At 408, the user interest matching module 160 receives the user interest group membership vectors 152*a*-152*n* for any number of users 102*a*-102*n* and assesses a particular user 102 based on the user interest group membership vector 152 associated with the particular user 102. The method 400 of analyzing the freeform text 106*a*-106*n* provided by the users 102*a*-102*n*, generating user interest groups 144*a*-144*n*, and generating user interest group membership vectors 152*a*-152*n* useful for identifying candidate or potential matches in a number of users 102*a*-102*n* concludes at 410.

Figure 5:
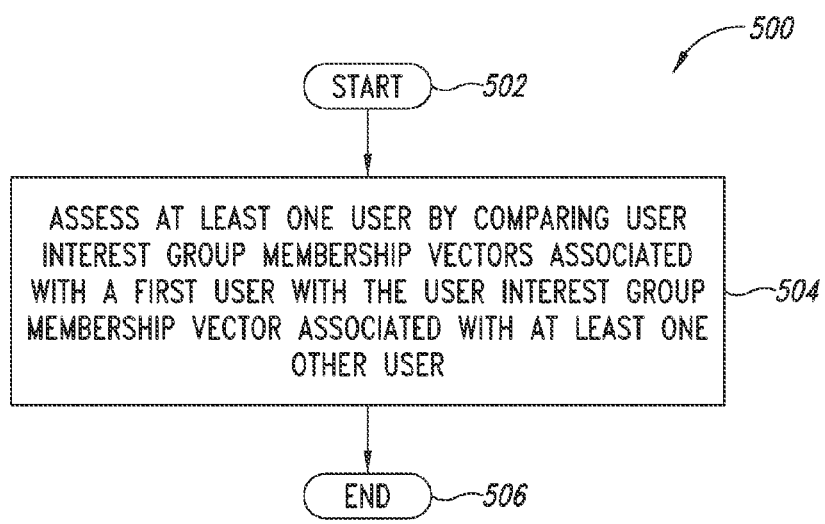
FIG. 5 is a flow diagram showing a high-level method of identifying candidate user matches by comparing the user interest group membership vectors for two or more users, according to one illustrated embodiment.

FIG. 5 shows a high-level method 500 of identifying candidate matches for a user 102*a* by comparing the logically associated user interest group membership vector 152*a* with user interest group membership vectors 152*b*-152*n* logically associated with other users 102*b*-102*n*, according to one illustrated embodiment. The method of identifying potential or candidate matches for a user 102*a* by comparing the logically associated user interest group membership vector 152*a* with user interest group membership vectors 152*b*-152*n* logically associated with other users 102*b*-102*n* commences at 502.

At 504, the user interest matching module 160 compares the user interest group membership vector 152*a* logically associated with a first user 102*a* with at least one other user interest group membership vector 152*b*-152*n* logically associated with at least one other user 102*b*-102*n* to identify candidate matches for the first user 102*a*.

In some implementations, the identification of candidate matches may include determining a value representative of a cosine similarity between the user interest group membership vector 152 provided by particular user 102 and the user interest group membership vector 152*a*-152*n* for each of the number of users 102*a*-102*n*. In such implementations, the user interest matching module 160 may determine a cosine similarity via the following:

$$s(\vec{x}, \vec{y}) = \frac{\vec{x} \cdot \vec{y}}{\|\vec{x}\| \|\vec{y}\|} \quad (9)$$

Where: $\|\ \|$ denotes the norm, i.e., $\|\vec{x}\| = \sqrt{\vec{x} \cdot \vec{x}}$ Equation (9) provides a value ranging from 0 to 1 that is indicative of the cosine similarity between two user interest group membership vectors 152*a*, 152*b*. Using equation (9), the greater the value, the greater the degree of similarity. Candidate matches for the first user 102*a* may be identified by the run-time subsystem 114 as those users whose user interest group membership vector 152 provides a cosine similarity value greater than one or more defined threshold values or falling within one or more defined threshold ranges. Alternately, matches for the first user 102*a* may be identified by the run-time subsystem 114 as those users whose user interest group membership vector 152 provides a simple ranked list of values.

In some implementations, the identification of candidate matches may include determining a value representative of a Euclidean distance between the user interest group membership vector 152 provided by particular user 102 and the user interest group membership vector 152*a*-152*n* for each of the number of users 102*a*-102*n*. In such implementations, the user interest matching module 160 may determine the Euclidean distance via the following:

$$d(\vec{x}, \vec{y}) = \frac{\|\vec{x} - \vec{y}\|}{\|\vec{x}\| + \|\vec{y}\|} \quad (10)$$

Equation (10) provides a value indicative of the Euclidean distance between two user interest group membership vectors 152*a*, 152*b*. Using equation (10), the smaller the value, the greater the degree of similarity between the two user interest group membership vectors 152*a*, 152*b*. Candidate matches for the first user 102*a* may be identified by the run-time subsystem 114 as those users whose user interest group membership vector 152 provides a Euclidean distance value below one or more defined threshold values or falling within one or more defined threshold ranges. The method of identifying potential or candidate matches for a user 102*a* by comparing the logically associated user interest group membership vector 152a with user interest group membership vectors 152b-152n logically associated with other users 102b-102n concludes at 506.

Figure 6:
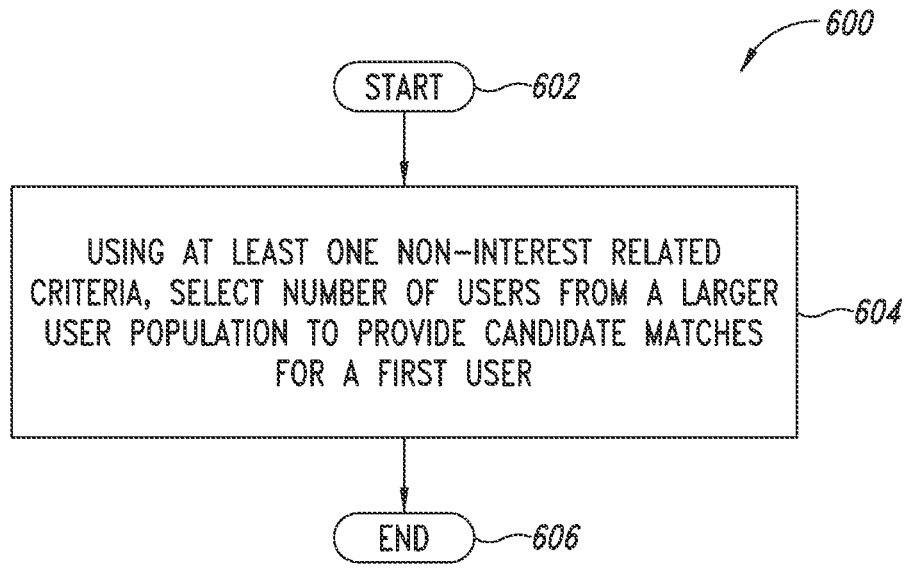
FIG. 6 is a flow diagram showing a high-level method of screening a number of users to identify a subset of potential or candidate matches for a user using one or more non-interest based selection criteria, according to one illustrated embodiment.

FIG. 6 shows a high-level method 600 of selecting a number of users 102b-102n from a larger user population to provide candidate matches for a first user 102a based on at least one non-interest related selection criteria, according to one illustrated embodiment. In at least some implementations, the service provider 108 or one or more front-end, non-interest based, matching systems (not shown) may select or otherwise choose a number of users 102b-102n from a larger user population. Such a selection process may, in some implementations, be used as a preliminary screening prior to evaluating the number of users 102b-102n via the evaluation system 110. In some implementations, the service provider 108 or front-end, non-interest based, matching system may select each user included in the number of users 102b-102n based at least in part on one or more non-interest related criteria to provide a smaller pool of candidate matches for the first user 102a. The method 600 of selecting a number of users 102b-102n from a larger user population to provide candidate matches for a first user 102a based on at least one non-interest related selection criteria commences at 602.

At 604, the service provider 108 or another front-end, non-interest based, matching system selects a number of users 102a-102n as candidate matches for a first user 102a. In some implementations, such a selection process is performed upstream of the evaluation system 110 and relies upon criteria other than user interests. For example, if the first user 102a is male, the service provider 108 or front-end, non-interest based, matching system may select a number of users 102b-102n that are female. In another example, if the first user 102a is a female with a preference for males between the ages of 30 and 40 with incomes in excess of $100,000, the service provider 108 or front-end, non-interest based, matching system may select a number of users meeting the non-interest based preferences expressed by the first user 102a.

The compatibility of the first user 102a with each of the users included in the number of users 102b-102n may be assessed by the evaluation system 110 using the user interest group membership vectors 152b-152n associated with the number of users 102b-102n selected from the larger user population. The method 600 of selecting a number of users 102b-102n from a larger user population to provide candidate matches for a first user 102a based on at least one non-interest related selection criteria commences at 606.

Figure 7:
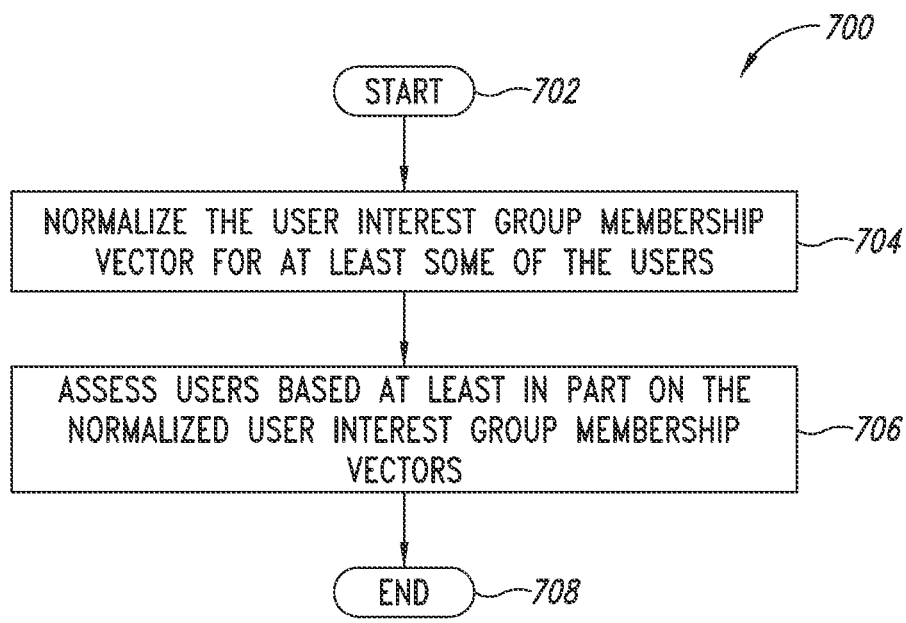
FIG. 7 is a flow diagram showing a high-level method of identifying candidate user matches by comparing normalized user interest group membership vectors for two or more users, according to one illustrated embodiment.

FIG. 7 shows a high-level method 700 of normalizing the user interest group membership vectors 152a-152n and assessing the normalized user interest group membership vectors 152a-152n to identify candidate or potential matches, according to one illustrated embodiment. The method 600 of normalizing the user interest group membership vectors 152a-152n and using the normalized user interest group membership vectors 152a-152n to identify candidate matches commences at 702.

At 704, the user interest group vector generation module 150 normalizes the user interest group membership vectors 152a-152n. In some implementations, the user interest group vector generation module 150 normalizes the element 154a-154n values in each user interest group membership vector 152 by summing the element values and dividing each respective element value by the element value total (i.e., percentage normalization). In other implementations, the user interest group vector generation module 150 normalizes the user interest group membership vector 152 by converting the vector to unit length (i.e., unit normalization).

At 706, the user interest matching module 160 assess some or all of the user interest group membership vectors 152a-152n normalized at 604 to identify candidate matches. The method 700 of normalizing the user interest group membership vectors 152a-152n and using the normalized user interest group membership vectors 152a-152n to identify candidate matches concludes at 708.

Figure 8:
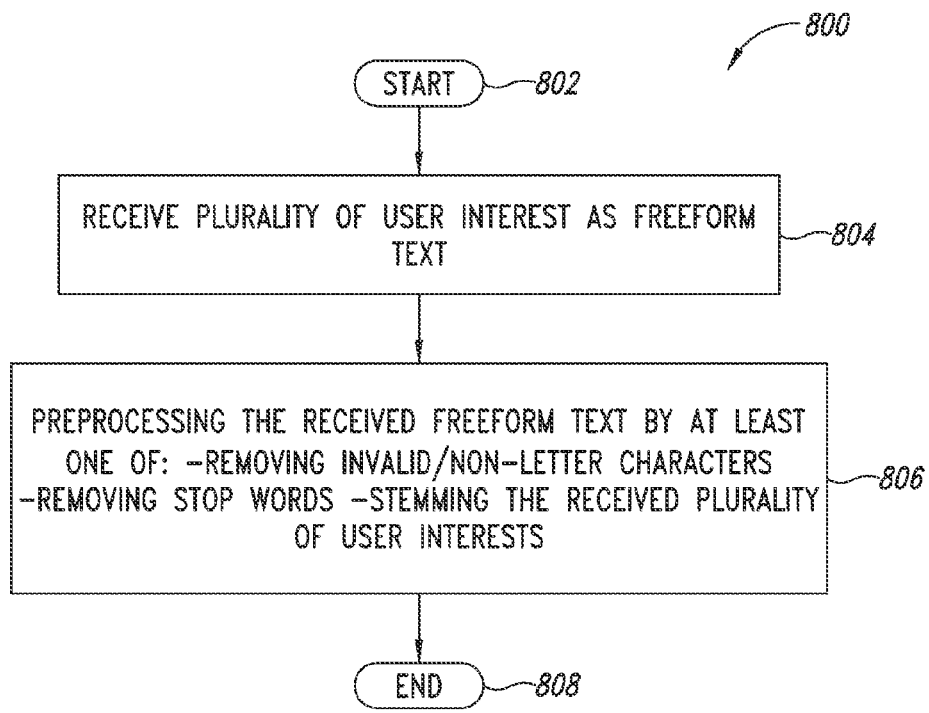
FIG. 8 is a flow diagram showing a high-level method of preprocessing freeform text entries provided by users and determining the user interest groups using the preprocessed freeform text entries provided by the users, according to one illustrated embodiment.

FIG. 8 shows a high-level method 800 of receiving a plurality of user interests as freeform text 106a-106n and preprocessing the freeform text 106a-106 using any number of preprocessing techniques. At times, such preprocessing of the freeform text 106a-106n is performed prior to introducing the freeform text 106 to the user interest term matrix generation module 130. The text entered by users 102a-102n as freeform text 106a-106n may include different words having similar meaning. For example, a first user may simply enter his/her interest as "skiing" while a second user may enter his/her interest as "I like to ski." Although both users have entered a similar interest, different words have been used. Additionally, freeform text may contain non-letter characters and word such as articles (a, the, etc.) and personal pronouns (I, me, my, etc.) that provide no additional information relevant to ascertaining a user's interests by the evaluation system 110. In such instances, the preprocessing the freeform text 106a-106n prior to introducing the text to the user interest term matrix generation module 130 may beneficially improve the quality of both the user interest group model 142, the user interest group membership vectors 152a-152n generated using the user interest group model 142, and the candidate matches identified using the user interest group membership vectors 152a-152n. The method 700 of preprocessing the freeform text 106a-106n commences at 802.

At 804, the preprocessing module 120 receives the freeform text 106a-106n from the service provider 108.

At 806, the preprocessing module 120 alters and/or edits the freeform text 106a-106n provided by the users 102a-102n preparatory to generating the user interest term matrix 132. In some instances, such alteration and/or editing of the freeform text 106 improves the overall performance of the user interest group model generator 140. The preprocessing module 120 removes non-letter characters from the freeform text 106. The preprocessing module 120 also removes "stopwords" from the freeform text 106. Stopwords include words such as articles (a, the, etc.), personal pronouns (I, me, my, etc.), and others that provide no indication of a user interest and are included in a defined dictionary accessible to the preprocessing module 120.

In some implementations, the preprocessing module 120 may also optionally stem the words in the freeform text 106. Such stemming may be performed using a Porter stemmer. A word stemmer stems different variations of a word back to a single word stem, for example "movie" and "movies" would both be stemmed to "movi." A word stemmer thus serves to reduce the number of words included in a vocabulary without reducing the overall richness or variety of concepts conveyed by the words included in the vocabulary. The method 800 of preprocessing the freeform text 106a-106n concludes at 808.

Figure 9:
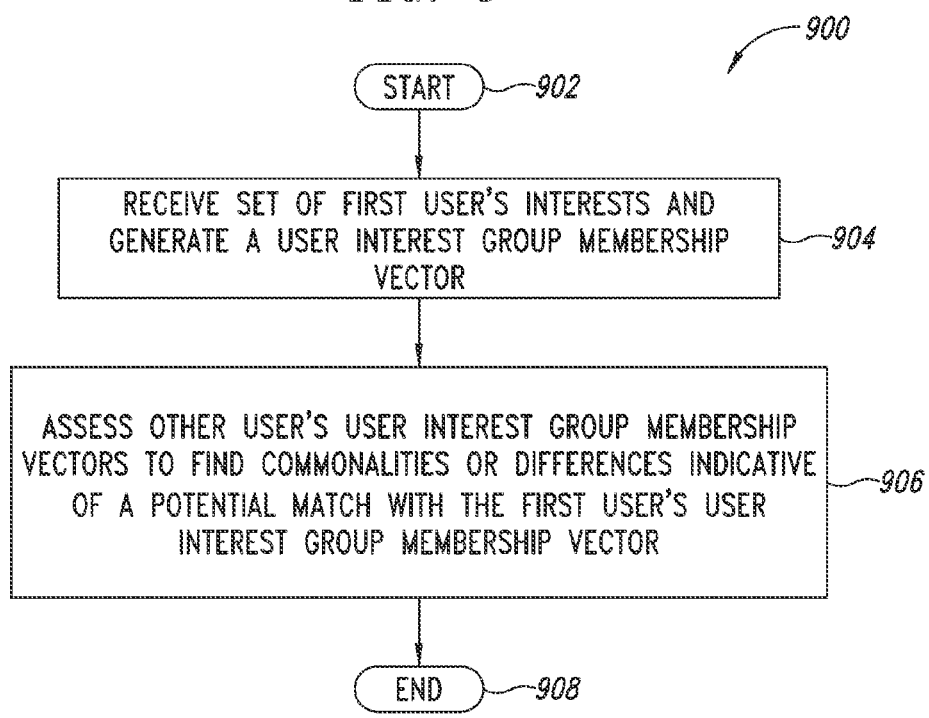
FIG. 9 is a flow diagram showing a high-level method of receiving a specified set of user defined interests, generating a user interest group membership vector for the user and evaluating candidate matches with other users by comparing the generated user interest group membership vector to other the user interest group membership vectors associated with the other users, according to one illustrated embodiment.

FIG. 9 shows a high-level method 900 of identifying candidate matches for a first user 102a based on the user interest group membership vector 152 generated using first user 102a provided freeform text 106a, according to one illustrated embodiment. As part of the "sign-up" or registration process to participate in or receive services from the service provider 108, each user 102 generates a user profile 104 that includes freeform text 106. Considered individually, the words included in the freeform text 106 provided by the user 102 identify the interests of the respective user. Additionally, considered collectively, the words included in the freeform text 106 provided by the user 102 may identify broader interests or conceptual interests of the respective user 102. The evaluation system 110 generates a user interest group membership vector 152 for the respective user 102 that considers broader concepts in the freeform text provided by the user 102. The user interest matching module 160 uses the broader concepts when comparing user interest group membership vectors 152 to identify candidate matches. The method 800 of identifying candidate matches based on user supplied freeform text 106 commences at 902.

At 904, the user interest group vector generation module 150 receives the freeform text 106 from the user profile 104 associated with a first user 102*a*. Responsive to the receipt of the freeform text 106, the user interest group vector generation module 150 generates a user interest group membership vector 152*a* for the first user 102*a* based at least in part on the freeform text 106 provided by the first user 102*a*.

At 906, the user interest matching module 160 identifies candidate matches for the first user 102*a* using the logically associated user interest group membership vector 152*a*. During run-time operation, the user interest matching module 160 compares the first user interest group membership vector 152*a* with any number of second user interest group membership vectors 152*b*-152*n* to identify candidate matching users having interests compatible with the interests provided by the first user 102*a*.

In some instances, the user interest matching module 160 identifies a candidate match by identifying a similarity, such as the cosine similarity discussed above with regard to FIG. 1, between the user interest group membership vector 152*a* of the first user 102*a* and the user interest group membership vector 152*b* of a second user 102*b*. The user interest matching module 160 generates a value indicative of the cosine similarity between two user interest group membership vectors 152*a*, 152*b*. The greater the cosine similarity value between two user interest group membership vectors 152*a*, 152*b*, the greater the degree of similarity between the two vectors. Candidate matches may be identified as those users whose user interest group membership vector 152 provide a cosine similarity value greater than one or more defined threshold values or falling within one or more defined threshold ranges. Alternately, candidate matches may be identified as those users whose user interest group membership vector 152 provide a simple ranked list of values.

In other instances, the user interest matching module 160 identifies a candidate match by identifying a distance, for example a Euclidean distance discussed above with regard to FIG. 1, between the user interest group membership vector 152*a* of the first user 102*a* and the user interest group membership vector 152*b* of a second user 102*b*. The user interest matching module 160 generates a value indicative of the Euclidean distance between two user interest group membership vectors 152*a*, 152*b*. The smaller the Euclidean distance value, the lesser the distance and the greater the degree of similarity between the two user interest group membership vectors 152*a*, 152*b*. Candidate matches may be identified as those users whose user interest group membership vector 152 provide a Euclidean distance value lesser than one or more defined threshold values or falling within one or more defined threshold ranges. The method 900 of identifying candidate matches based on user supplied freeform text 106 concludes at 908.

Figure 10:
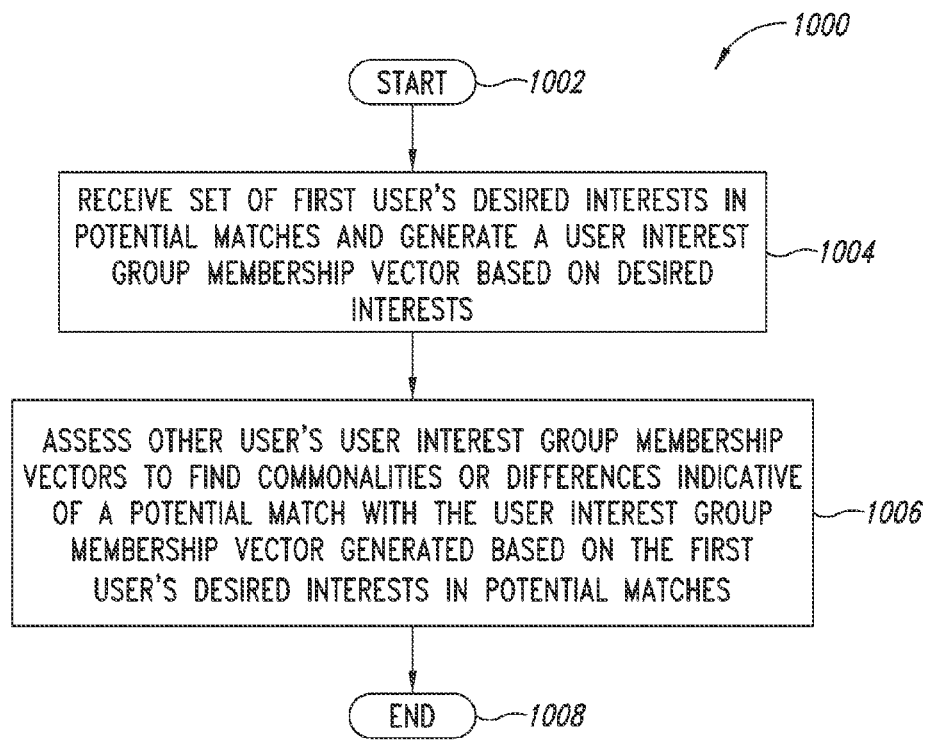
FIG. 10 is a flow diagram showing a high-level method of assessing candidate users in a number of users by comparing the user interest group membership vectors for the candidate users with a user interest group membership vector generated using desired interests provided by a first user, according to one illustrated embodiment.

FIG. 10 shows a high-level method 1000 of identifying candidate matches for a first user 102*a* based on a hypothetical user interest group membership vector 152 generated using first user 102*a* provided interests desired in a candidate match, according to one illustrated embodiment. At times, the first user 102*a* may have a known or defined set of interests they would find desirable in a candidate match. Such candidate matches may be identified by the evaluation system 110 in addition to or instead of candidate matches identified using the respective user's own interests provided as freeform text 106 in the user's profile 104. The method 1000 of identifying candidate matches based on a hypothetical user interest group membership vector 152 generated via user supplied desired candidate match interests commences at 1002.

At 1004, the user interest group vector generation module 150 receives desired candidate match interests from a first user 102*a*. Such desired candidate match interests may be provided by the first user 102*a* in the form of a freeform text entry 106 received by the service provider 108. Responsive to the receipt of the freeform text 106 indicative of the desired candidate match interests, the user interest group vector generation module 150 generates a hypothetical user interest group membership vector 152 using the desired candidate match interests provided by the first user 102*a*.

At 1006, in addition to or instead of using the first user's user interest group membership vector 152*a*, the user interest matching module 160 identifies candidate matches for the first user 102*a* using the hypothetical user interest group membership vector 152 generated at 804. During run-time operation, the user interest matching module 160 compares the hypothetical user interest group membership vector 152 with any number of user interest group membership vectors 152*b*-152*n* to identify candidate matches having interests compatible with the desired interests provided by the first user 102*a*.

In some instances, the user interest matching module 160 identifies a candidate match by identifying a similarity, such as the cosine similarity discussed above with regard to FIG. 1, between the hypothetical user interest group membership vector 152 and the user interest group membership vector 152*b* of a second user 102*b*. The user interest matching module 160 generates a value indicative of the cosine similarity between two user interest group membership vectors 152, 152*b*. The greater the cosine similarity value between two user interest group membership vectors 152, 152*b*, the greater the degree of similarity between the two vectors. Candidate matches may be identified as those users whose user interest group membership vector 152 provide a cosine similarity value greater than one or more defined threshold values or falling within one or more defined threshold ranges. Alternately, candidate matches may be identified as those users whose user interest group membership vector 152 provide a simple ranked list of values.

In other instances, the user interest matching module 160 identifies a candidate match by identifying a distance, for example a Euclidean distance discussed above with regard to FIG. 1, between the hypothetical user interest group membership vector 152 and the user interest group membership vector 152*b* of a second user 102*b*. The user interest matching module 160 generates a value indicative of the Euclidean distance between two user interest group membership vectors 152, 152*b*. The smaller the Euclidean distance value, the lesser the distance and the greater the degree of similarity between the two user interest group membership vectors 152, 152b. Candidate matches may be identified as those users whose user interest group membership vector 152 provide a Euclidean distance value lesser than one or more defined threshold values or falling within one or more defined threshold ranges. The method 1000 of identifying candidate matches based on a hypothetical user interest group membership vector 152 generated via user supplied desired candidate match interests concludes at 1008.

Figure 11:
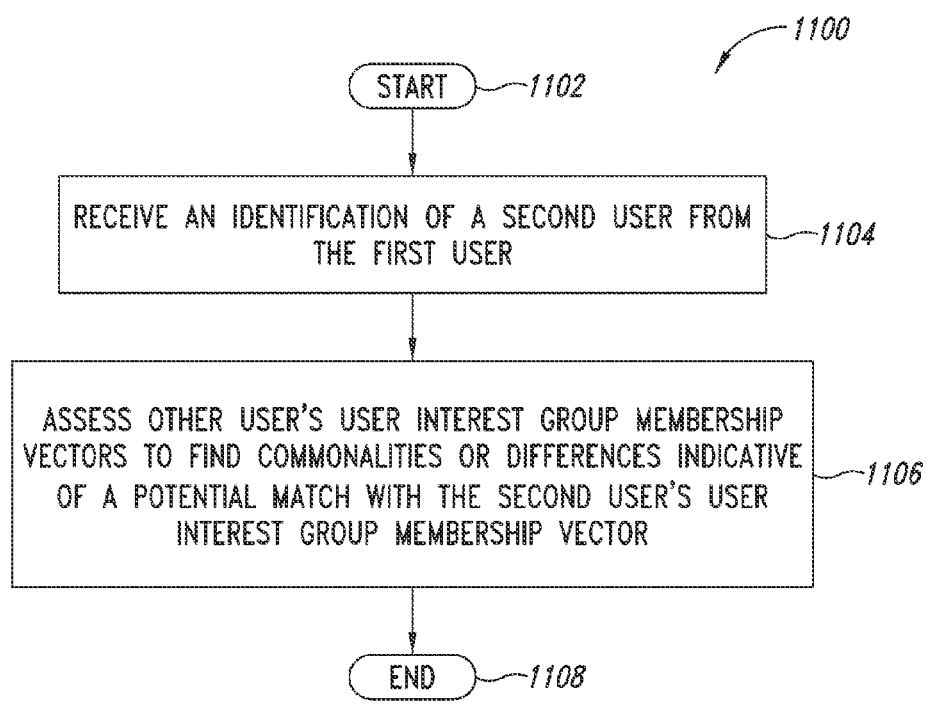
FIG. 11 is a flow diagram showing a high-level method of assessing candidate users in a number of users by comparing the user interest group membership vectors for the candidate users with a user interest group membership vector associated with a second user chosen by a first user, according to one illustrated embodiment.

FIG. 11 shows a high-level method 1100 of identifying candidate matches for a first user 102a based on a user interest group membership vector 152b logically associated with a second user 102b selected by the first user 102a, according to one illustrated embodiment. At times, the first user 102a may be familiar with a second user 102b (e.g., the second user 102b may be a friend or acquaintance of the first user 102a) with whom they share mutually compatible interests that the first user 102a would find desirable in a candidate match. The user interest matching module 160 may identify such candidate matches in addition to or instead of candidate matches identified using the respective user's own logically associated user interest group membership vector 152a. The method 1100 of identifying candidate matches based on a user interest group membership vector 152b logically associated with a second user 102b commences at 1102.

At 1104, the evaluation system 110 receives from a first user 102a data indicative of a second user 102b who shares mutually compatible interests that the first user 102a would find desirable in a candidate match.

At 1106, in addition to or instead of using the first user's user interest group membership vector 152a, the user interest matching module 160 identifies candidate matches for the first user 102a using the user interest group membership vector 152 logically associated with the second user 102b. During run-time operation, the user interest matching module 160 compares the second user's user interest group membership vector 152b with any number of user interest group membership vectors 152c-152n to identify candidate matches having interests compatible with the second user 102b. In some implementations, the user interest matching module 160 may specifically exclude candidate matches users having at least one non-interest related trait that disqualifies the candidate match (e.g., candidate matches that have compatible interests based the user interest group membership vectors 152, but who are friends or family of the first users 102a).

In some instances, the user interest matching module 160 identifies a candidate match by identifying a similarity, such as the cosine similarity discussed above with regard to FIG. 1, between the second user's user interest group membership vector 152b and the user interest group membership vector 152c of another user 102c. The user interest matching module 160 generates a value indicative of the cosine similarity between two user interest group membership vectors 152b, 152c. The greater the cosine similarity value between two user interest group membership vectors 152b, 152c, the greater the degree of similarity between the two vectors. Candidate matches may be identified as those users whose user interest group membership vector 152 provide a cosine similarity value greater than one or more defined threshold values or falling within one or more defined threshold ranges of the second user's user interest group membership vector 152b. Alternately, candidate matches may be identified as those users whose user interest group membership vector 152 provide a simple ranked list of values.

In other instances, the user interest matching module 160 identifies a candidate match by identifying a distance, for example a Euclidean distance discussed above with regard to FIG. 1, between the second user's user interest group membership vector 152b and the user interest group membership vector 152c of another user 102c. The user interest matching module 160 generates a value indicative of the Euclidean distance between two user interest group membership vectors 152b, 152c. The smaller the Euclidean distance value, the lesser the distance and the greater the degree of similarity between the two user interest group membership vectors 152b, 152c. Candidate matches may be identified as those users whose user interest group membership vector 152 provide a Euclidean distance value lesser than one or more defined threshold values or falling within one or more defined threshold ranges of the second user's user interest group membership vector 152b. The method 1100 of identifying candidate matches based on a user interest group membership vector 152b logically associated with a second user 102b concludes at 1108.

Figure 12:
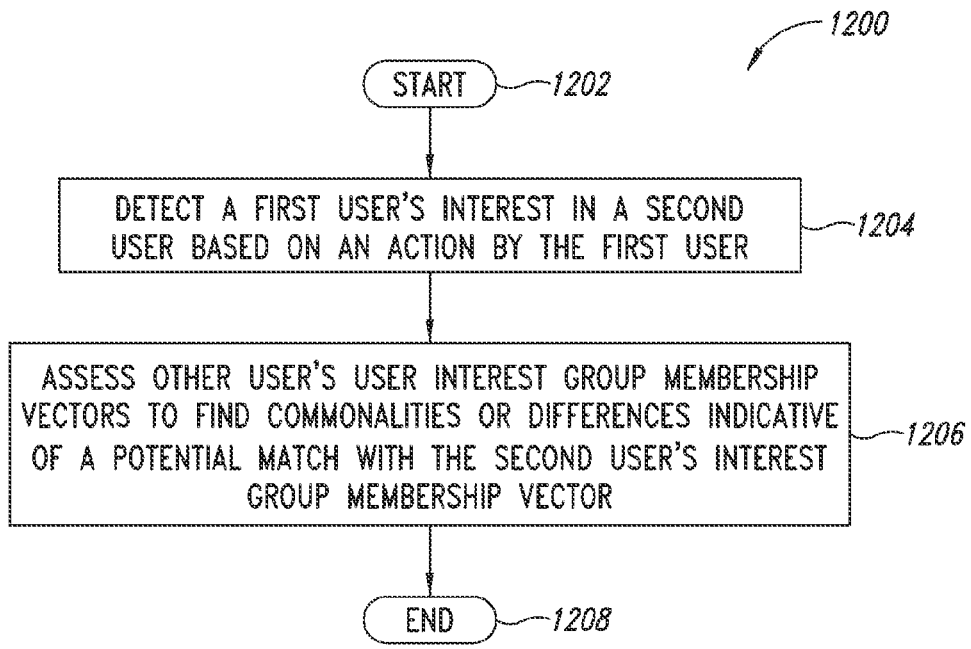
FIG. 12 is a flow diagram showing a high-level method of assessing candidate users in a number of users by comparing the user interest group membership vectors for the candidate users with a user interest group membership vector associated with a second user that is autonomously selected based at least in part on an action by a first user, according to one illustrated embodiment.

FIG. 12 shows a high-level method 1100 of identifying candidate matches for a first user 102a based on a user interest group membership vector 152b logically associated with a second user 102b selected based on one or more actions taken and/or activities performed the first user 102a, according to one illustrated embodiment. At times, the actions or activities of a first user 102a may provide insight into compatible matches for the first user 102a. For example, the first user may hover a pointer over an image or a profile logically associated with a second user 102b. Such interest in the second user 102b, even though explicitly unexpressed by the first user 102a may be indicative that the first user 102a finds attractive and/or desirable and therefore indicates a suitable candidate match for the first user 102a.

Based at least in part on the first user's actions and/or activities but not based on an express interest in the second user 102b by the first user 102a, the service provider 108 may communicate data indicative of the second user 102b to the user interest matching module 160. Such communication of data indicative of the second user 102b may be performed by the service provider 108 with or without the knowledge and/or consent of the first user 102b. The user interest matching module 160 may use the user interest group membership vector 152b logically associated with the second user 102b to identify additional candidate matches in addition to or instead of candidate matches identified using the first user's own logically associated user interest group membership vector 152a. The method 1200 of identifying candidate matches based on a user interest group membership vector 152b logically associated with a second user 102b selected based on one or more actions taken and/or activities performed the first user 102a commences at 1202.

At 1204, the service provider 108 detects a first user's interest in a second user 102b based on one or more actions or activities performed by the first user 102a and in the absence of an express indication by the first user 102a of an interest in the second user 102b. Such actions or activities may include for example, the first user 102a hovering over an image and/or profile associated with the second user 102b.

At 1206, in addition to or instead of using the first user's user interest group membership vector 152a, the user interest matching module 160 identifies candidate matches for the first user 102a using the user interest group membership vector 152b logically associated with the second user 102b. During run-time operation, the user interest matching module 160 compares the second user's user interest group membership vector 152b with any number of user interest group membership vectors 152c-152n to identify candidate matches having interests compatible with the second user 102b.

In some instances, the user interest matching module 160 identifies a candidate match by identifying a similarity, such as the cosine similarity discussed above with regard to FIG. 1, between the second user's user interest group membership vector 152b and the user interest group membership vector 152c of another user 102c. The user interest matching module 160 generates a value indicative of the cosine similarity between two user interest group membership vectors 152b, 152c. The greater the cosine similarity value between two user interest group membership vectors 152b, 152c, the greater the degree of similarity between the two vectors. Candidate matches may be identified as those users whose user interest group membership vector 152 provide a cosine similarity value greater than one or more defined threshold values or falling within one or more defined threshold ranges of the second user's user interest group membership vector 152b. Alternately, candidate matches may be identified as those users whose user interest group membership vector 152 provide a simple ranked list of values.

In other instances, the user interest matching module 160 identifies a candidate match by identifying a distance, for example a Euclidean distance discussed above with regard to FIG. 1, between the second user's user interest group membership vector 152b and the user interest group membership vector 152c of another user 102c. The user interest matching module 160 generates a value indicative of the Euclidean distance between two user interest group membership vectors 152b, 152c. The smaller the Euclidean distance value, the lesser the distance and the greater the degree of similarity between the two user interest group membership vectors 152b, 152c. Candidate matches may be identified as those users whose user interest group membership vector 152 provide a Euclidean distance value lesser than one or more defined threshold values or falling within one or more defined threshold ranges of the second user's user interest group membership vector 152b. The method 1200 of identifying candidate matches based on a user interest group membership vector 152b logically associated with a second user 102b selected based on one or more actions taken and/or activities performed the first user 102a commences at 1208.

Figure 13:
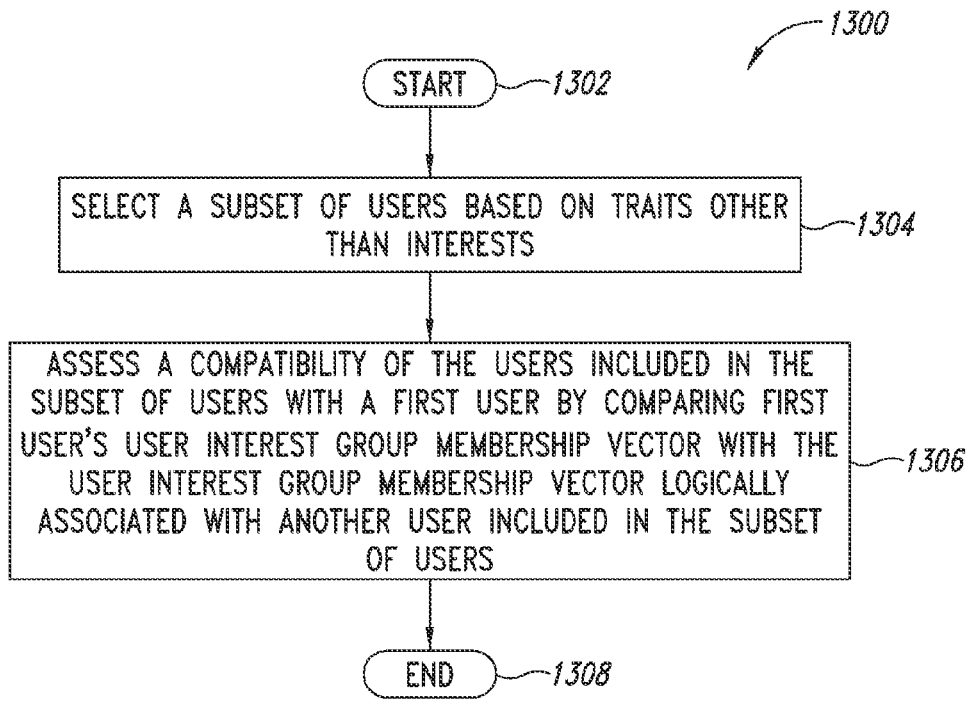
FIG. 13 is a flow diagram showing a high-level method of assessing a compatibility of the users included in a first subset of users with a first one of the users, according to one illustrated embodiment.

FIG. 13 shows a high-level method 1300 of assessing the compatibility of a first user 102a with at least one other user 102b included in a subset of users 102b-102n using the user interest group membership vectors 152a and 152b, according to one illustrated embodiment. At times, it may be desirable to assess the compatibility of a first user 102a with a subset or group including a plurality of users 102b-102n. The method 1300 of assessing the compatibility of a first user 102a with at least one second user 102b that is included in a subset or group including a plurality of users 102b-102n commences at 1302.

At 1304, a subset or group that includes a plurality of users 102b-102n is formed based on at least one user trait other than a user interest. Such traits may include, for example, a user's geographic location, a user's age, a user's sex, a user's orientation, a user's ethnicity, or any other non-interest related trait. In some instances, the service provider 108 may autonomously select some or all of the users 102b-102n included in the subset or group. In some instances, the evaluation system 110 may autonomously select some or all of the users included in the subset or group.

At 1306, the user interest matching module 160 assesses the first user 102a against at least one second user 102b included in the subset of users 102b-102n by comparing the first user's user interest group membership vector 152a with the user interest group membership vector 152b of the at least one second user 102b included in the subset or group.

In some instances, the user interest matching module 160 assesses the compatibility of a first user 102a with a second user 102b included in the subset or group of users 102b-102n by determining a value indicative of a similarity, such as a cosine similarity, between the first user's user interest group membership vector 152a and the second user's user interest group membership vector 152b. The user interest matching module 160 generates a value indicative of the cosine similarity between two user interest group membership vectors 152a, 152b. The greater the cosine similarity value between two user interest group membership vectors 152a, 152b, the greater the degree of similarity between the two vectors.

In other instances, the user interest matching module 160 assesses the compatibility of a first user 102a with a second user 102b included in the subset or group of users 102b-102n by determining a value indicative of a distance, such as the Euclidean distance, between the first user's user interest group membership vector 152a and the second user's user interest group membership vector 152b. The smaller the Euclidean distance value between the user interest group membership vectors 152a, 152b, the lesser the distance and the greater the degree of similarity between the two vectors. The method 1300 of assessing the compatibility of a first user 102a with at least one second user 102b that is included in a subset or group including a plurality of users 102b-102n concludes at 1308.

Figure 14:
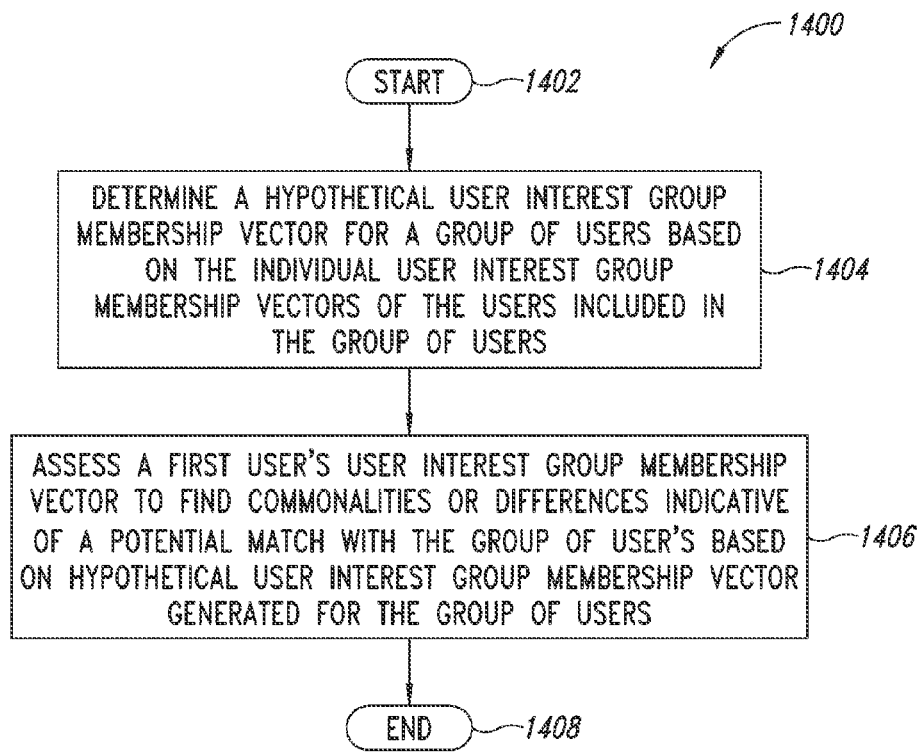
FIG. 14 is a flow diagram showing a high-level method of assessing the compatibility of a first user with a first plurality of users by comparing the first user's user interest group membership vector with a hypothetical user interest group membership vector for the first plurality of users, according to one illustrated embodiment.

FIG. 14 shows a high-level method 1400 of assessing the compatibility of a first user 102a with a plurality of other users 102b-102n by comparing the first user's user interest group membership vector 152a with a hypothetical user interest group membership vector 152 generated using the user interest group membership vectors 152b-152n logically associated with the plurality of users 102b-102n, according to one illustrated embodiment. The method 1400 of assessing the compatibility of a first user 102a with a plurality of other users 102b-102n commences at 1402.

At 1404, the evaluation system 110 generates a hypothetical user interest group membership vector 152 using the individual user interest group membership vectors 152b-152n of the users 102b-102n included in the plurality of users 102b-102n. In some instances, the plurality of users 102b-102n may include users having at least one demographic attribute in common. Example demographic attributes include, but are not limited to, a user's gender, a user's age, a user's income, a user's orientation, a user's religion, and a user's ethnicity. In some instances, the plurality of users 102b-102n may include users sharing a defined geographic locale. Example geographic locales include, but are not limited to, a user's city, a user's state, and a user's nation. In some instances, the hypothetical user interest group membership vector 152 may be determined using at least one of a mean or a median of the user interest group membership vectors 152b-152n of the users 102b-102n included in the plurality of users.

At 1406, the user interest matching module 160 assesses the compatibility of the first user 102a with the other users 102b-102n included in the plurality of users by comparing the first user's user interest group membership vector 152a with the hypothetical user interest group membership vector 152 generated at 1404.

In some instances, the user interest matching module 160 assesses the compatibility of the first user 102a with the other users 102b-102n included in the plurality of users by determining a value indicative of a similarity, such as a cosine similarity, between the first user's user interest group membership vector 152a and the hypothetical user interest group membership vector 152 generated at 1404. The user interest matching module 160 generates a value indicative of the cosine similarity between two user interest group membership vectors 152a, 152. The greater the cosine similarity value between two user interest group membership vectors 152a, 152, the greater the degree of similarity between the two vectors.

In other instances, the user interest matching module 160 assesses the compatibility of the first user 102a with the other users 102b-102n included in the plurality of users by determining a value indicative of a distance, such as the Euclidean distance, between the first user's user interest group membership vector 152a and the hypothetical user interest group membership vector generated at 1404. The smaller the Euclidean distance value between the user interest group membership vectors 152a, 152, the lesser the distance and the greater the degree of similarity between the two vectors.

In some implementations, the evaluation system 110 may provide an output to the service provider that includes a value or other data indicative of the degree of similarity and/or the degree of difference (e.g., the distance) between the user interest group membership vectors 152a, 152. At times, the service provider 108 may display the value or other data indicative of the degree of similarity and/or the degree of difference between the user interest group membership vectors 152a, 152 to the first user 102a and/or some or all of the plurality of users 102b-102n. The method 1400 of assessing the compatibility of a first user 102a with a plurality of other users 102b-102n concludes at 1408.

Figure 15:
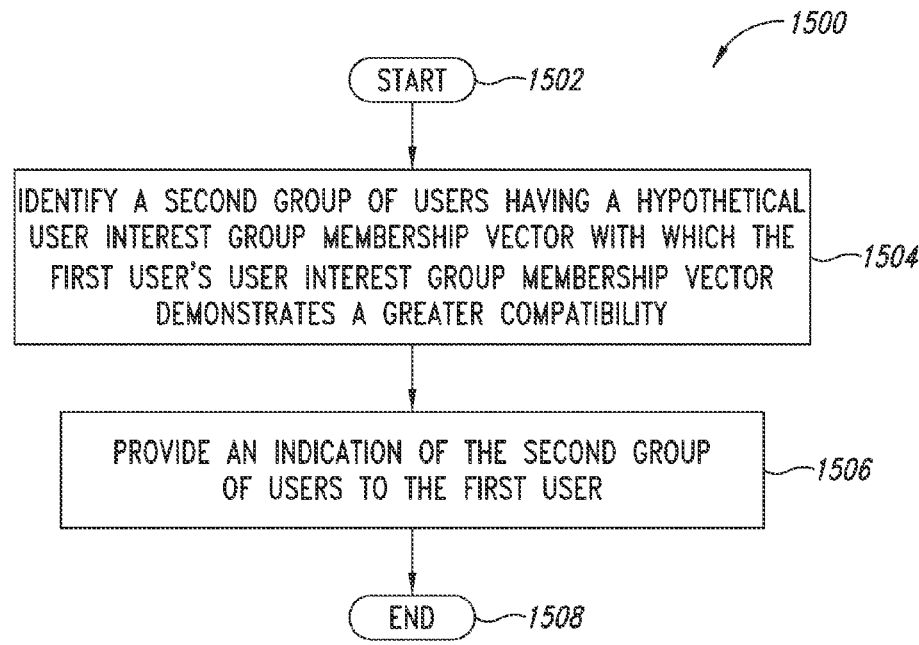
FIG. 15 is a flow diagram showing a high-level method of identifying a second plurality of users demonstrating a greater compatibility with the first user based on a hypothetical user interest group membership vector representative of the individual users included in the second group and a first user's user group membership vector, according to one illustrated embodiment.

FIG. 15 shows a high-level method 1500 that may be used in along with method 1300 (to determine the compatibility of the first user 102a with a first plurality of users 102b-102n) to identify at least one second plurality of users 102b'-102n' with whom the first user 102a may have a greater degree of compatibility, according to one illustrated embodiment. As discussed with regard to FIG. 14, the compatibility of the first user 102a with a first plurality of users 102b-102n may be assessed by generating a hypothetical user interest group membership vector 152 representative of the first plurality of users 102b-102n and determining the correlation, degree of similarity, or distance between the hypothetical user interest group membership vector 152 and the first user's user interest group membership vector 152a. In some instances, the evaluation system 110 and/or the service provider 108 may autonomously identify a second plurality of users 102b'-102n' with whom the first user 102a has an even greater compatibility. The method 1500 of identifying a second plurality of users 102b'-102n' with whom the first user has a greater compatibility commences at 1502.

At 1504, at least one second plurality of users 102b'-102n' is created and a hypothetical user interest group membership vector 152' is determined by the evaluation system 110 based at least in part on the individual user interest group membership vectors 152b'-152n'. The user interest matching module 160 determines a respective hypothetical user interest group membership vector 152' for the second plurality of users 102b'-102n'. The user interest matching module 160 also determines the compatibility of the first user 102a with the second plurality of users 102b'-102n' by determining the correlation, degree of similarity, or distance between the hypothetical user interest group membership vector 152' and the first user's user interest group membership vector 152a.

By comparing the correlation, degree of similarity, or distance of between the first user's user interest group membership vector 152a and the user interest group membership vector 152 of the first plurality of users 102b-102n and the user interest group membership vector 152' of the second plurality of users 102b'-102n', the user interest matching module 160 can determine whether a greater compatibility exists between the first user 102a and the first plurality of users 102b-102n or the second plurality of users 102b'-102n'.

In some instances, the users 102b'-102n' included in the second plurality of users may have at least one attribute or characteristic common to the users 102b-102n included in the first plurality of users and may have at least one attribute or characteristic that is not common to the users 102b-102n included in the first plurality of users. In some instances, the first plurality of users 102b-102n may be selected based upon sharing a first geographic locale and the second plurality of users 102b'-102n' may be selected based upon sharing a second geographic locale that is different than the first geographic locale.

At 1506, the service provider 108 can provide an indication of the second plurality of users 102b'-102n' to the first user 102a. The method 1500 of identifying a second plurality of users 102b'-102n' with whom the first user 102a has a greater compatibility than a first plurality of users 102b-102n concludes at 1508.

Figure 16:
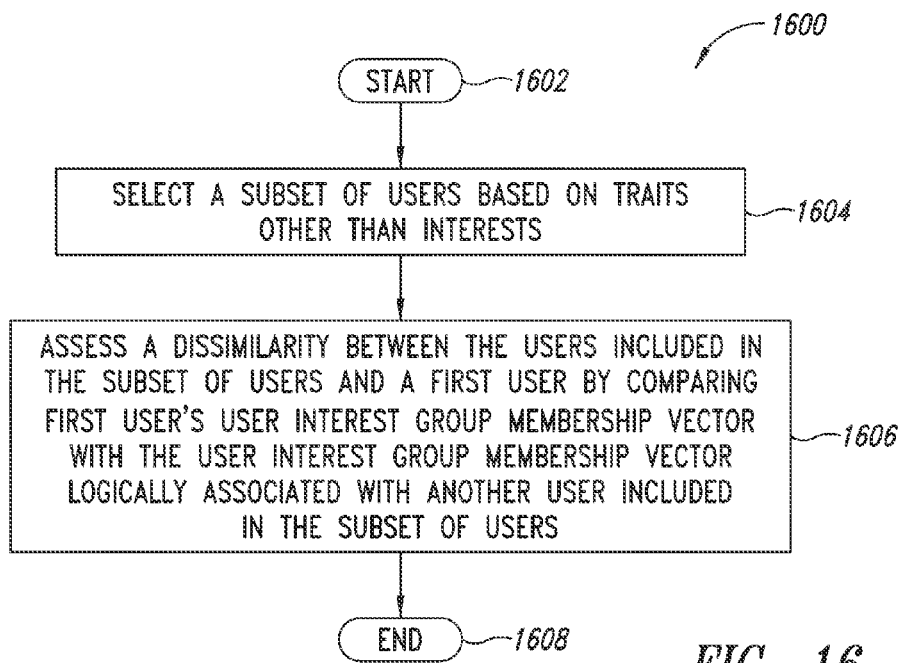
FIG. 16 is a flow diagram showing a high-level method of assessing a dissimilarity between the users included in a first subset of users and a first one of the users, according to one illustrated embodiment.

FIG. 16 shows a high-level method 1600 of assessing the dissimilarity between a first user 102a and at least one other user 102b included in a subset of users 102b-102n using the user interest group membership vectors 152a and 152b logically associated with each of the users, according to one illustrated embodiment. At times, it may be desirable to assess the dissimilarity or to quantify the degree of dissimilarity existent between a first user 102a and a second user 102b included in a subset or group including a plurality of users 102b-102n. The method 1600 of assessing the dissimilarity or degree of dissimilarity existent between a first user 102a and at least one second user 102b that is included in a subset or group including a plurality of users 102b-102n commences at 1602.

At 1604, a subset or group that includes a plurality of users 102b-102n is formed based on at least one user trait other than a user interest. Such traits may include, for example, a user's geographic location, a user's age, a user's sex, a user's orientation, a user's ethnicity, or any other non-interest related trait. In some instances, the service provider 108 may autonomously select some or all of the users 102b-102n included in the subset or group. In some instances, the evaluation system 110 may autonomously select some or all of the users included in the subset or group.

At 1606, the user interest matching module 160 assesses the first user 102a against at least one second user 102b included in the subset of users 102b-102n by comparing the first user's user interest group membership vector 152a with the user interest group membership vector 152b of the at least one second user 102b included in the subset or group.

In some instances, the user interest matching module 160 assesses the dissimilarity or degree of dissimilarity existent between a first user 102a and at least one second user 102b included in the subset or group of users 102b-102n by determining a value indicative of a similarity, such as a cosine similarity, between the first user's user interest group membership vector 152a and the second user's user interest group membership vector 152b. In such instances, the user interest matching module 160 generates a value indicative of the cosine similarity between two user interest group membership vectors 152a, 152b. The lesser the cosine similarity value between two user interest group membership vectors 152a, 152b, the lesser the degree of similarity between the two vectors and consequently, the greater the degree of dissimilarity in user interests between the first user 102a and the at least one second user 102b.

In other instances, the user interest matching module 160 assesses the dissimilarity or degree of dissimilarity existent between a first user 102a and at least one second user 102b included in the subset or group of users 102b-102n by determining a value indicative of a distance, such as the Euclidean distance, between the first user's user interest group membership vector 152a and the at least one second user's user interest group membership vector 152b. The greater the Euclidean distance value between the user interest group membership vectors 152a, 152b, the greater the distance between the vectors and the lesser the degree of similarity between the two vectors and consequently, the greater the degree of dissimilarity in user interests between the first user 102a and the at least one second user 102b. The method 1600 of assessing the dissimilarity or degree of dissimilarity existent between a first user 102a and at least one second user 102b that is included in a subset or group including a plurality of users 102b-102n concludes at 1608.

Figure 17:
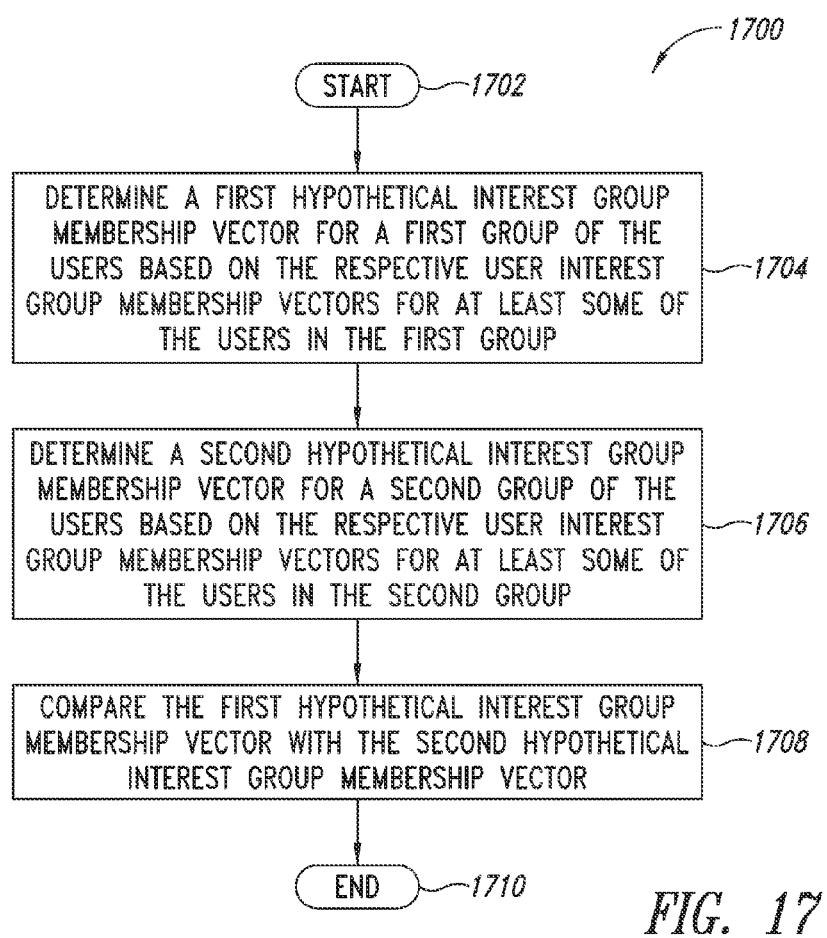
FIG. 17 is a flow diagram showing a high-level method of comparing a first plurality of the users with a second plurality of the users based on respective hypothetical interest group membership vectors determined for each of the first plurality of the users and the second plurality of the users, according to one illustrated embodiment.

FIG. 17 shows a high-level method 1700 of assessing the compatibility or similarity between a first plurality of the users and a second plurality of the users based on respective hypothetical interest group membership vectors for each of the first plurality of the users and the second plurality of the users, according to one illustrated embodiment. A first hypothetical interest group membership vector 152' is determined at least in part based on the respective user interest group membership vectors 152a'-152n' associated with the users 102a'-102n' included in the first plurality of users. A second hypothetical interest group membership vector 152" is determined at least in part based on the respective user interest group membership vectors 152a"-152n" associated with the users 102a"-102n" included in the second plurality of users. The first and the second hypothetical interest group membership vectors 152' and 152" are compared and the level of similarity or dissimilarity assessed. The method 1700 of assessing the compatibility or similarity between a first plurality of the users 102a'-102n' and a second plurality of the users 102a"-102n" based on respective hypothetical interest group membership vectors for each of the first plurality of the users and the second plurality of the users commences at 1702.

At 1704, the evaluation system 110 generates a first hypothetical user interest group membership vector 152' using at least some of the individual user interest group membership vectors 152a'-152n' of the users 102a'-102n' included in the first plurality of the users. In some instances, some or all of the users 102a'-102n' selected for inclusion in the first plurality of the users may be autonomously determined, for example by the service provider 108. In some instances, some or all of the users 102a'-102n' selected for inclusion in the first plurality of the users may be manually selected, for example based on the receipt by the service provider 108 of a user's interest in being included in the first plurality of the users 102a'-102n'. The hypothetical user interest group membership vector 152' logically associated with the first plurality of the users 102a'-102n' may be determined using at least one of a mean or a median of the user interest group membership vectors 152a'-152n' of the users 102a'-102n' included in the first plurality of the users.

At 1706, the evaluation system 110 generates a second hypothetical user interest group membership vector 152" using at least some of the individual user interest group membership vectors 152a"-152n" of the users 102a"-102n" included in the second plurality of the users. In some instances, some or all of the users 102a"-102n" selected for inclusion in the second plurality of the users may be autonomously determined, for example by the service provider 108. In some instances, some or all of the users 102a"-102n" selected for inclusion in the second plurality of the users may be manually selected, for example based on the receipt by the service provider 108 of a user's interest in being included in the first plurality of the users 102a"-102n". The hypothetical user interest group membership vector 152" logically associated with the second plurality of the users 102a"-102n" may be determined using at least one of a mean or a median of the user interest group membership vectors 152a"-152n" of the users 102a"-102n" included in the second plurality of the users.

At 1708, the user interest matching module 160 assesses the first compatibility of the first hypothetical user interest group membership vector 152' with the second user interest group membership vector 152". In some instances, by determining the similarity between the two hypothetical user interest group membership vectors, the user interest matching module 160 is able to quantify a degree of similarity between the first plurality of the users 102a'-102n' and the second plurality of the users 102a"-102n". Such information may be useful, for example in assisting the service provider 108 in providing recommendations regarding whether a first group represented by the first plurality of the users 102a'-102n' would be compatible with a second group represented by the second plurality of users 102a"-102n".

In some instances, the user interest matching module 160 assesses the compatibility of the first plurality of users 102a102n' with the second plurality of users 102a"-102n" by determining a value indicative of a similarity, such as a cosine similarity, between the first hypothetical user interest group membership vector 152' and the second hypothetical user interest group membership vector 152". The user interest matching module 160 generates a value indicative of the cosine similarity between two user interest group membership vectors 152', 152".

The greater the cosine similarity value between two hypothetical user interest group membership vectors 152', 152", the greater the degree of similarity between the two vectors.

In other instances, the user interest matching module 160 assesses the compatibility of the first plurality of users 102a'-102n' with the second plurality of users 102a"-102n" by determining a value indicative of a distance, such as the Euclidean distance, between the first hypothetical user interest group membership vector 152' and the second hypothetical user interest group membership vector 152". The smaller the Euclidean distance value between the hypothetical user interest group membership vectors 152', 152", the lesser the distance and the greater the degree of similarity between the two vectors. The method 1700 of assessing the compatibility or similarity between a first plurality of the users 102a'-102n' and a second plurality of the users 102a"-102n" based on hypothetical interest group membership vectors for each of the first plurality of the users and the second plurality of the users concludes at 1710.

Figure 18:
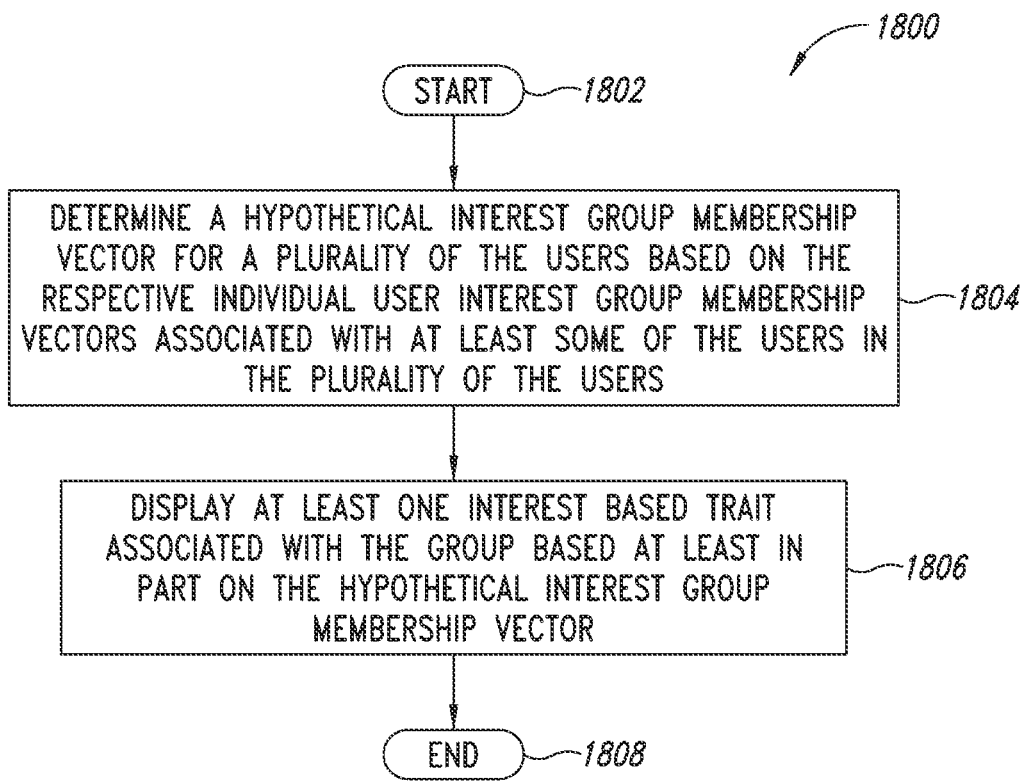
FIG. 18 is a flow diagram showing a high-level method of generating a hypothetical interest group membership vector for a plurality of the users and displaying at least one interest based trait associated with the plurality of the users based on the hypothetical interest group membership vector, according to one illustrated embodiment.

FIG. 18 shows a high-level method 1800 of determining a hypothetical user interest group membership vector 152 for a plurality of users 102a-102n and displaying at least one interest-based trait associated with the plurality of users, according to one illustrated embodiment. A hypothetical interest group membership vector 152 is determined at least in part based on the respective user interest group membership vectors 152a-152n associated with each of the users 102a-102n included in the first plurality of users. Using the data provided by the hypothetical interest group membership vector 152, the run time subsystem 114 and/or the service provider 108 can determine one or more interest-related traits associated with the plurality of users 102a-102n included in the group. The method 1800 of determining a hypothetical user interest group membership vector 152 for a plurality of users 102a-102n and displaying at least one interest-based trait associated with the plurality of users commences at 1802.

At 1804, the evaluation system 110 generates a hypothetical user interest group membership vector 152 using at least some of the individual user interest group membership vectors 152a-152n associated with each of the users 102a-102n included in a plurality of the users. In some instances, some or all of the users 102a-102n selected for inclusion in the first plurality of the users may be autonomously determined, for example by the service provider 108. In some instances, such autonomous selection may be based on one or more non-interest related traits, such as a user's sex, age, income, geographic location, education, profession, and similar. In some instances, some or all of the users 102a-102n selected for inclusion in the plurality of the users may be manually selected, for example based on the receipt by the service provider 108 of a user's interest in being included in the plurality of the users 102a-102n. The hypothetical user interest group membership vector 152 logically associated with the plurality of the users 102a-102n may be determined using at least one of a mean or a median of the user interest group membership vectors 152a-152n of the users 102a-102n included in the first plurality of the users.

At 1806, the evaluation system 110 determines one or more interest-related traits associated with the users 102a-102n included in the plurality of the users. Such analysis may, for example, determine that users included in the plurality of users based on a geographic location (e.g., Portland, Oreg.) have strong interests in outdoor-related backcountry activities. The method 1800 of determining a hypothetical user interest group membership vector 152 for a plurality of users 102a-102n and displaying at least one interest-based trait associated with the plurality of users concludes at 1808.

Figure 19:
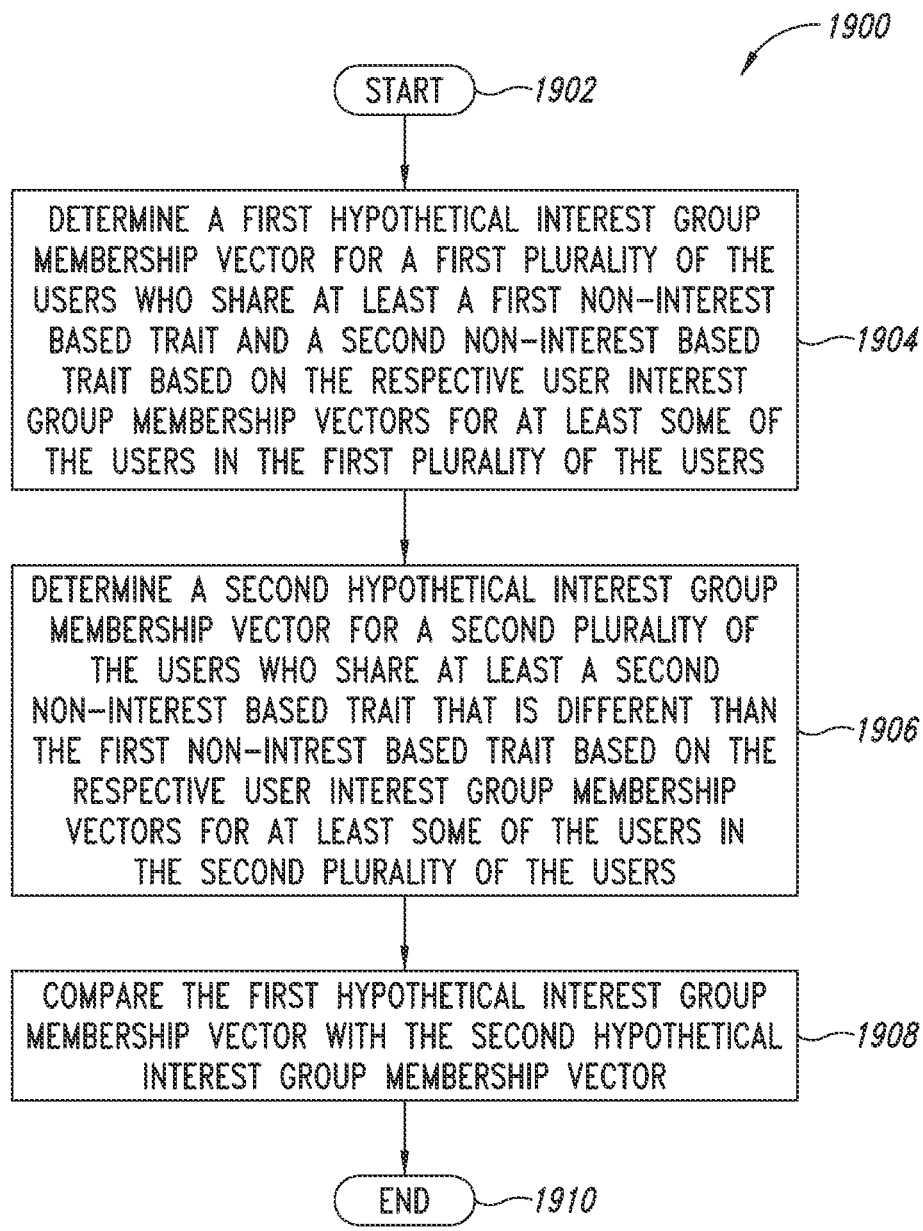
FIG. 19 is a flow diagram showing a high-level method of comparing a first plurality of the users who share a first non-interest based trait and a second non-interest based trait with a second plurality of the users who share the first non-interest based trait and a third non-interest based trait based on respective hypothetical interest group membership vectors determined for each of the first plurality of the users and the second plurality of the users, according to one illustrated embodiment.

FIG. 19 shows a high-level method 1900 of assessing the compatibility or similarity between a first plurality of the users that share a first non-interest related trait and a second plurality of the users that share a second non-interest related trait that is different than the first non-interested related trait based at least in part on respective hypothetical interest group membership vectors for the first plurality of the users and the second plurality of the users, according to one illustrated embodiment. A first hypothetical interest group membership vector 152' is determined at least in part based on the respective user interest group membership vectors 152a'-152n' associated with the users 102a'-102n' included in the first plurality of users. The first plurality of users share a first non-interest related trait. A second hypothetical interest group membership vector 152" is determined at least in part based on the respective user interest group membership vectors 152a"-152n" associated with the users 102a"-102n" included in the second plurality of users. The second plurality of users share a second non-interest related trait that is different than the first non-interest related trait.

Such a method may be used, for example, to compare hypothetical user interest group membership vector for a first plurality of users (in Vancouver, BC (the first non-interest related trait) with the hypothetical user interest group membership vector for a second plurality of users in Los Angeles, Calif. (the second non-interest related trait). The first and the second hypothetical interest group membership vectors 152' and 152" are compared and a level of similarity or dissimilarity assessed. The method 1900 of assessing the compatibility or similarity between a first plurality of the users 102a'-102n' and a second plurality of the users 102a"-102n" based on hypothetical interest group membership vectors for each of the first plurality of the users and the second plurality of the users commences at 1902.

At 1904, the evaluation system 110 generates a first hypothetical user interest group membership vector 152' using at least some of the individual user interest group membership vectors 152a'-152n' of the users 102a'-102n' included in the first plurality of the users. The users 102a'-102n' included in the first plurality of users share at least a first non-interest related trait. In at least one implementation, the first non-interest related trait may include one or more geographic indicators (e.g., Vancouver, BC). In some instances, some or all of the users 102a'-102n' selected for inclusion in the first plurality of the users may be autonomously determined, for example by the service provider 108. In some instances, some or all of the users 102a'-102n' selected for inclusion in the first plurality of the users may be manually selected, for example based on the receipt by the service provider 108 of a user's interest in being included in the first plurality of the users 102a'-102n'. The hypothetical user interest group membership vector 152' logically associated with the first plurality of the users 102a'-102n' may be determined using at least one of a mean or a median of the user interest group membership vectors 152a'-152n' of the users 102a'-102n' included in the first plurality of the users.

At 1906, the evaluation system 110 generates a second hypothetical user interest group membership vector 152" using at least some of the individual user interest group membership vectors 152a"-152n" of the users 102a"-102n" included in the second plurality of the users. The users 102a"-102n" included in the second plurality of users share at least a second, non-interest related, trait. In at least one implementation, the second non-interest related trait may be different than the first non-interest related trait and may include one or more geographic indicators (e.g., Austin, Tex.). In some instances, some or all of the users 102a"-102n" selected for inclusion in the second plurality of the users may be autonomously determined, for example by the service provider 108. In some instances, some or all of the users 102a"-102n" selected for inclusion in the second plurality of the users may be manually selected, for example based on the receipt by the service provider 108 of a user's interest in being included in the first plurality of the users 102a"-102n". The hypothetical user interest group membership vector 152" logically associated with the second plurality of the users 102a"-102n" may be determined using at least one of a mean or a median of the user interest group membership vectors 152a"-152n" of the users 102a"-102n" included in the second plurality of the users.

In some implementations, the first plurality of users 102a'-102n' and the second plurality of users 102a"-102n" may share a third, non-interest related, trait. For example, the third, non-interest related, trait may include a demographic trait (e.g., age, gender, income, education, occupation, and the like). In conjunction with a geographic first trait and second trait, such would allow comparing the similarities and/or differences between a first plurality of users sharing the third (demographic) trait (e.g., males) who also share a first geographic trait (e.g., in Vancouver, BC) with a second plurality of users also sharing the third trait (e.g., males) who also share the second geographic trait (e.g., in Miami, Fla.).

At 1908, the user interest matching module 160 assesses the compatibility of the first plurality of users with the second plurality of users by comparing the first hypothetical user interest group membership vector 152' with the second user interest group membership vector 152". In some instances, by determining the similarity between the two hypothetical user interest group membership vectors, the user interest matching module 160 is able to quantify a degree of similarity or degree of difference existent between the first plurality of the users 102a'-102n' and the second plurality of the users 102a"-102n". Such information may be useful, for example in assisting the service provider 108 in determining whether the interests of the first plurality of the users 102a'-102n' in a first geographic area would be similar or different than the interests of the second plurality of users 102a"-102n" in a second geographic area.

In some instances, the user interest matching module 160 assesses the compatibility of the first plurality of users 102a'-102n' with the second plurality of users 102a"-102n" by determining a value indicative of a similarity, such as a cosine similarity, between the first hypothetical user interest group membership vector 152' and the second hypothetical user interest group membership vector 152". The user interest matching module 160 generates a value indicative of the cosine similarity between two user interest group membership vectors 152', 152". The greater the cosine similarity value between two hypothetical user interest group membership vectors 152', 152", the greater the degree of similarity between the two vectors.

In other instances, the user interest matching module 160 assesses the compatibility of the first plurality of users 102a'-102n' with the second plurality of users 102a"-102n" by determining a value indicative of a distance, such as the Euclidean distance, between the first hypothetical user interest group membership vector 152' and the second hypothetical user interest group membership vector 152". The smaller the Euclidean distance value between the hypothetical user interest group membership vectors 152', 152", the lesser the distance and the greater the degree of similarity between the two vectors. The method 1900 of assessing the similarity or differences between a first plurality of the users and a second plurality of the users based on hypothetical interest group membership vectors for each of the first plurality of the users and the second plurality of the users concludes at 1910.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. All of the commonly assigned US patent application publications, US patent applications, foreign patents, and foreign patent applications referred to in this specification and/or listed in the Application Data Sheet, including but not limited to U.S. Provisional Patent Application No. 61/976,296, filed Apr. 7, 2014 are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in an evaluation system, the evaluation system including at least one processor and at least one nontransitory processor-readable medium that stores at least one of processor-executable instructions or data, the at least one nontransitory processor-readable medium communicatively coupled to the at least one processor, the method comprising:

deriving by the at least one processor a set of user interest groups from a plurality of user interests specified by a plurality of users as freeform text, where the number of interest groups in the set of user interest groups is less than a total number of user interests in the plurality of user interests specified by the plurality of users;

for each of a number of the users, determining by the at least one processor a respective interest group membership vector based on respective user interests specified by the respective user, the interest group membership vector having one or more elements which represent a partial membership in respective ones of one or more of the interest groups; and assessing by the at least one processor at least one of the users based at least in part on at least one of the interest group membership vectors.

2. The method of claim 1 wherein assessing at least one of the users based at least in part on at least one of the interest group membership vectors includes comparing a respective interest group membership vector for a first one of the users with the respective interest group membership vector for at least one other one of the users.

3. The method of claim 2 wherein comparing a respective interest group membership vector for a first one of the users with the respective interest group membership vector for at least one other one of the users includes determining a distance between the respective interest group membership vector for the first one of the users and the respective interest group membership vector for the at least one other one of the users.

4. The method of claim 2 wherein comparing a respective interest group membership vector for a first one of the users with the respective interest group membership vector for at least one other one of the users includes determining a similarity between the respective interest group membership vector for the first one of the users and the respective interest group membership vector for the at least one other one of the users.

5. The method of claim 1, further comprising:
for at least one of the interest group membership vectors, normalizing by the at least one processor the respective interest group membership vector, and wherein assessing at least one of the users based at least in part on at least one of the interest group membership vectors includes assessing at least a first one of the users based at least in part on the normalized respective interest group membership vector for the first one of the users.

6. The method of claim 1 wherein for each of a number of the users, determining a respective interest group membership vector based on respective user interests specified by the respective user includes determining a respective interest group membership vector for each active user associated with a first defined language or first defined dialect of a language.

7. The method of claim 1, further comprising:
receiving the plurality of user interests specified by the plurality of users as freeform text; and
preprocessing the received plurality of user interests specified by the plurality of users as freeform text.

8. The method of claim 7 wherein preprocessing the received plurality of user interests specified by the plurality of users as freeform text includes at least one of:
removing by the at least one processor characters that are not valid letters in a valid language from the received plurality of user interests specified by the plurality of users as freeform text;
removing by the at least one processor stop words from the received plurality of user interests specified by the plurality of users as freeform text; or
performing by the at least one processor stemming on the received plurality of user interests specified by the plurality of users as freeform text.

9. The method of claim 8 wherein deriving a set of user interest groups from a plurality of user interests specified by a plurality of users as freeform text includes deriving the set of interest groups from the preprocessed plurality of user interests specified by the plurality of users, where user interests includes at least one incorrect spelling of a user interest, and at least one pair of alternative names for a given user interest.

10. The method of claim 1 wherein deriving a set of user interest groups from a plurality of user interests specified by a plurality of users as freeform text includes generating a generative natural language processing model based at least in part on the plurality of user interests specified by the plurality of users as freeform text.

11. The method of claim 10 wherein generating a generative natural language processing model includes preforming a Latent Dirichlet Allocation on preprocessed user interests specified by the plurality of users as freeform text.

12. The method of claim 10 wherein each of the users provides a respective set of user interest words in freeform text and deriving a set of user interest groups from a plurality of user interests specified by a plurality of users as freeform text includes computing for a number of interest words a respective term frequency-inverse document frequency.

13. The method of claim 1, further comprising:
receiving a set of self-specified user interests provided by a first one of the users, and wherein assessing at least one of the users based at least in part on at least one of the interest group membership vectors includes assessing potential matches with other ones of the users based on an assessment in commonality or differences between the respective interest group membership vector of the first one of the users and respective interest group membership vectors of the other ones of the users.

14. The method of claim 1, further comprising:
receiving a set of user interests desired by a first one of the users in another one of the users;
generating a hypothetical interest group membership vector based on the received set of user interests desired by the first one of the users in another one of the users, and wherein assessing at least one of the users based at least in part on at least one of the interest group membership vectors includes assessing potential matches with other ones of the users based on an assessment in commonality or differences between the hypothetical interest group membership vector and respective interest group membership vectors of the other ones of the users.

15. The method of claim 1, further comprising:
receiving an identification of one user by a first one of the users, and wherein assessing at least one of the users based at least in part on at least one of the interest group membership vectors includes assessing potential matches with other ones of the users based on an assessment in commonality or differences between a respective interest group membership vector of the identified one of the users and respective interest group membership vectors of other ones of the users.

16. The method of claim 15 wherein receiving an identification of one user by a first one of the users includes receiving identification of at least one user who has at least one trait, other than user interests, which disqualifies the respective at least one user as a match for the first one of the users.

17. The method of claim 1, further comprising:
detecting an interest in one user by a first one of the users, and wherein assessing at least one of the users based at least in part on at least one of the interest group membership vectors includes assessing potential matches with other ones of the users based on an assessment in commonality or differences between a respective interest group membership vector of the one of the users in which the interest was detected and respective interest group membership vectors of other ones of the users.

18. The method of claim 1, further comprising:
selecting by the at least one processor a first subset of the users based on traits other than user interests, and wherein assessing at least one of the users based at least in part on at least one of the interest group membership vectors includes assessing a compatibility of the users of the first subset of users with a first one of the users based on a respective interest group membership vector for the first one of the users with the respective interest group membership vector for the other one of the users in the first subset of the users.

19. The method of claim 1, further comprising:
determining by the at least one processor at least one hypothetical interest group membership vector based on the respective interest group membership vectors of a plurality of the users, and wherein assessing at least one of the users based at least in part on at least one of the interest group membership vectors includes comparing a respective interest group membership vector for a first user with the at least one hypothetical interest group membership vector.

20. The method of claim 19 wherein determining at least one hypothetical interest group membership vector based on the respective interest group membership vectors of a plurality of the users includes determining at least one of a mean or median of the respective interest group membership vectors of the set of users.

21. The method of claim 19 wherein determining at least one hypothetical interest group membership vector based on the respective interest group membership vectors of a plurality of the users includes determining the at least one hypothetical interest group membership vector based on the respective interest group membership vectors of a set of users that each have at least one demographic attribute in common.

22. The method of claim 19 wherein determining at least one hypothetical interest group membership vector based on the respective interest group membership vectors of a plurality of the users includes determining the at least one hypothetical interest group membership vector based on the respective interest group membership vectors of a set of users that each have a geographic locale in common.

23. The method of claim 19, further comprising:
determining a relative distance between the respective interest group membership vector of the first user and the at least one hypothetical interest group membership vector; and
providing an indication of the determined relative distance.

24. The method of claim 19, further comprising:
identifying at least one other set of users with which the first user is more compatible based on the respective interest group membership vector of the first user and at least one hypothetical interest group membership vector of the at least one other set of users; and
providing an indication of the determined other set of users with which the first user is more compatible.

25. The method of claim 24, further comprising:
selecting the set of users based on at least a first characteristic that is common to the users of the first set; and
selecting the at least one other set of users based on at least a second characteristic that is common to the users of the second set and not common to the users of the first set.

26. The method of claim 24, further comprising:
selecting the set of users based on at least a first geographical locale that is common to the users of the first set; and
selecting the at least one other set of users based on at least a second geographic locale that is common to the users of the second set and not common to the users of the first set.

27. The method of claim 1, further comprising:
selecting by the at least one processor a first subset of the users based on traits other than user interests, and wherein assessing at least one of the users based at least in part on at least one of the interest group membership vectors includes assessing a dissimilarity of the users of the first subset of users with a first one of the users based on a respective interest group membership vector for the first one of the users with the respective interest group membership vector for the other one of the users in the first subset of the users.

28. The method of claim 1, further comprising:
determining by the at least one processor at least one hypothetical interest group membership vector based on the respective interest group membership vectors of a plurality of the users, and wherein assessing at least one of the users based at least in part on at least one of the interest group membership vectors includes displaying at least one interest-based characteristic of the group identified at least in part via the hypothetical interest group membership vector.

29. The method of claim 1, further comprising:
determining by the at least one processor a first hypothetical interest group membership vector based on the respective interest group membership vectors of a first plurality of the users;
determining by the at least one processor a second hypothetical interest group membership vector based on the respective interest group membership vectors of a second plurality of the users; and
wherein assessing at least one of the users based at least in part on at least one of the interest group membership vectors includes determining at least one of a similarity or a dissimilarity between the first plurality of the users the second plurality of the users by comparing the first hypothetical interest group membership vector with the second hypothetical group membership vector.

30. The method of claim 1, further comprising:
determining by the at least one processor the first hypothetical interest group membership vector based on the respective interest group membership vectors of the first plurality of the users who share at least a first non-interest based trait;
determining by the at least one processor a second hypothetical interest group membership vector based on the respective interest group membership vectors of the second plurality of the users who share at least a second non-interest based trait that is different than the first non-interest based trait; and
wherein assessing at least one of the users based at least in part on at least one of the interest group membership vectors includes comparing the interests of the first plurality of the users as provided by the first hypothetical interest group membership vector with the interests of the second plurality of the users as provided by the second hypothetical group membership vector.

31. The method of claim 30 wherein determining by the at least one processor the first hypothetical interest group membership vector based on the respective interest group membership vectors of the first plurality of the users who share at least a first non-interest based trait includes;
determining by the at least one processor the first hypothetical interest group membership vector based on the respective interest group membership vectors of the first plurality of the users who share at least a first non-interest based trait that includes a defined first geographic location; and
wherein determining by the at least one processor the second hypothetical interest group membership vector based on the respective interest group membership vectors of the second plurality of the users who share at least the second non-interest based trait includes;
determining by the at least one processor the second hypothetical interest group membership vector based on the respective interest group membership vectors of the second plurality of the users who share at least the second non-interest based trait that includes a defined second geographic location.

32. The method of claim 30 wherein the first plurality of the users and the second plurality of the users share at least a third non-interest based trait and wherein determining by the at least one processor the first hypothetical interest group membership vector based on the respective interest group membership vectors of the first plurality of the users who share at least a first non-interest based trait and a second non-interest based trait includes;
determining by the at least one processor the first hypothetical interest group membership vector based on the respective interest group membership vectors of the first plurality of the users who share at least a first non-interest based trait that includes a defined first geographic location and a third non-interest based trait; and
wherein determining by the at least one processor the second hypothetical interest group membership vector based on the respective interest group membership vectors of the second plurality of the users who share at least the second non-interest based trait and a third non-interest based trait includes;
determining by the at least one processor the second hypothetical interest group membership vector based on the respective interest group membership vectors of the second plurality of the users who share at least the second non-interest based trait that includes a defined second geographic location and a third non-interest based trait.

33. An evaluation system, comprising:
at least one processor; and
at least one nontransitory processor-readable medium communicatively coupled to the at least one processor that stores at least one of processor-executable instructions or data that when executed by the at least one processor cause the at least one processor to:
derive a set of user interest groups from a plurality of user interests specified by a plurality of users as freeform text, where the number of interest groups in the set of user interest groups is less than a total number of user interests in the plurality of user interests specified by the plurality of users;
for each of a number of the users, determine a respective interest group membership vector based on respective user interests specified by the respective user the interest group membership vector having one or more elements which represent a partial membership in respective ones of one or more of the interest groups; and
assess at least one of the users based at least in part on at least one of the interest group membership vectors.

34. The system of claim 33 wherein the processor-executable instructions that cause the at least one processor to assess at least one of the users based at least in part on at least one of the interest group membership vectors, further cause the at least one processor to:
compare a respective interest group membership vector for a first one of the users with the respective interest group membership vector for at least one other one of the users.

35. The system of claim 34 wherein the processor-executable instructions that cause the at least one processor to compare the respective interest group membership vector for a first one of the users with the respective interest group membership vector for at least one other one of the users, further causes the at least one processor to:
determine a distance between the respective interest group membership vector for the first one of the users and the respective interest group membership vector for the at least one other one of the users.

36. The system of claim 34 wherein the processor-executable instructions that cause the at least one processor to compare a respective interest group membership vector for a first one of the users with the respective interest group membership vector for at least one other one of the users, further causes the at least one processor to:
determine a similarity between the respective interest group membership vector for the first one of the users and the respective interest group membership vector for the at least one other one of the users.

37. The system of claim 33 wherein the processor-executable instructions further cause the at least one processor to:
normalize the respective interest group membership vector for at least one of the interest group membership vectors; and
wherein the processor-executable instructions that cause the at least one processor to assess at least one of the users based at least in part on at least one of the interest group membership vectors, further causes the at least one processor to:
assess at least a first one of the users based at least in part on the normalized respective interest group membership vector for the first one of the users.

38. The system of claim 33 wherein the processor-executable instructions that cause the at least one processor to determine a respective interest group membership vector based on respective user interests specified by the respective user, further causes the at least one processor to:
determine a respective interest group membership vector for each active user associated with a first defined language or first defined dialect of a language.

39. The system of claim 33 wherein the processor-executable instructions further cause the at least one processor to:
receive the plurality of user interests specified by the plurality of users as freeform text; and
preprocess the received plurality of user interests specified by the plurality of users as freeform text.

40. The system of claim 39 wherein the processor-executable instructions that cause the at least one processor to preprocess the received plurality of user interests specified by the plurality of users as freeform text, further causes the at least one processor to at least one of:
- remove characters that are not valid letters in a valid language from the received plurality of user interests specified by the plurality of users as freeform text;
- remove stop words from the received plurality of user interests specified by the plurality of users as freeform text; or
- perform stemming on the received plurality of user interests specified by the plurality of users as freeform text.

41. The system of claim 40 wherein the processor-executable instructions that cause the at least one processor to derive a set of user interest groups from a plurality of user interests specified by a plurality of users as freeform text, further causes the at least one processor to:
- derive the set of interest groups from the preprocessed plurality of user interests specified by the plurality of users, which user interests includes at least one incorrect spelling of a user interest, and at least one pair of alternative names for a given user interest.

42. The system of claim 33 wherein the processor-executable instructions that cause the at least one processor to derive a set of user interest groups from a plurality of user interests specified by a plurality of users as freeform text, further cause the at least one processor to:
- generate a generative natural language processing model based at least in part on the plurality of user interests specified by the plurality of users as freeform text.

43. The system of claim 42 wherein the processor-executable instructions that cause the at least one processor to generate a generative natural language processing model, further cause the at least one processor to:
- perform a Latent Dirichlet Allocation on preprocessed user interests specified by the plurality of users as freeform text.

44. The system of claim 42 wherein the processor-executable instructions that cause the at least one processor to derive a set of user interest groups from a plurality of user interests specified by a plurality of users as freeform text, further causes the at least one processor to:
- compute for a number of interest words, provided by each of the users provides a respective set of user interest words in freeform text, a respective term frequency-inverse document frequency.

45. The system of claim 33 wherein the processor-executable instructions further cause the at least one processor to:
- receive a set of self-specified user interests provided by a first one of the users, and wherein assessing at least one of the users based at least in part on at least one of the interest group membership vectors includes assessing potential matches with other ones of the users based on an assessment in commonality or differences between the respective interest group membership vector of the first one of the users and respective interest group membership vectors of the other ones of the users.

46. The system of claim 33 wherein the processor-executable instructions further cause the at least one processor to:
- receive a set of user interests desired by a first one of the users in another one of the users;
- generate a hypothetical interest group membership vector based on the received set of user interests desired by the first one of the users in another one of the users, and wherein assessing at least one of the users based at least in part on at least one of the interest group membership vectors includes assessing potential matches with other ones of the users based on an assessment in commonality or differences between the hypothetical interest group membership vector and respective interest group membership vectors of the other ones of the users.

47. The system of claim 33 wherein the processor-executable instructions further cause the at least one processor to:
- receive an identification of one user by a first one of the users, and wherein assessing at least one of the users based at least in part on at least one of the interest group membership vectors includes assessing potential matches with other ones of the users based on an assessment in commonality or differences between a respective interest group membership vector of the identified one of the users and respective interest group membership vectors of other ones of the users.

48. The system of claim 47 wherein the processor-executable instructions that cause the at least one processor to receive an identification of one user by a first one of the users, further causes the at least one processor to:
- receive identification of at least one user who has at least one trait, other than user interests, which disqualifies the respective at least one user as a match for the first one of the users.

49. The system of claim 33 wherein the processor-executable instructions further cause the at least one processor to:
- detect an interest in one user by a first one of the users, and wherein assessing at least one of the users based at least in part on at least one of the interest group membership vectors includes assessing potential matches with other ones of the users based on an assessment in commonality or differences between a respective interest group membership vector of the one of the users in which the interest was detected and respective interest group membership vectors of other ones of the users.

50. The system of claim 33 wherein the processor-executable instructions further cause the at least one processor to:
- select by the at least one processor a first subset of the users based on traits other than user interests, and wherein assessing at least one of the users based at least in part on at least one of the interest group membership vectors includes assessing a compatibility of the users of the first subset of users with a first one of the users based on a respective interest group membership vector for the first one of the users with the respective interest group membership vector for the other one of the users in the first subset of the users.

51. The system of claim 33 wherein the processor-executable instructions further cause the at least one processor to:
- determine by the at least one processor at least one hypothetical interest group membership vector based on the respective interest group membership vectors of a plurality of the users, and wherein assessing at least one of the users based at least in part on at least one of the interest group membership vectors includes comparing a respective interest group membership vector for a first user with the at least one hypothetical interest group membership vector.

52. The system of claim 51 wherein the processor-executable instructions that cause the at least one processor to determine at least one hypothetical interest group membership vector based on the respective interest group membership vectors of a plurality of the users, further causes the at least one processor to:
- determine at least one of a mean or median of the respective interest group membership vectors of the set of users.

53. The system of claim 51 wherein the processor-executable instructions that cause the at least one processor to determine at least one hypothetical interest group membership vector based on the respective interest group membership vectors of a plurality of the users, further causes the at least one processor to:
  determine the at least one hypothetical interest group membership vector based on the respective interest group membership vectors of a set of users that each have at least two demographic attributes in common.

54. The system of claim 51 wherein the processor-executable instructions that cause the at least one processor to determine at least one hypothetical interest group membership vector based on the respective interest group membership vectors of a plurality of the users, further causes the at least one processor to:
  determine the at least one hypothetical interest group membership vector based on the respective interest group membership vectors of a set of users that each have a geographic locale in common.

55. The system of claim 51 wherein the processor-executable instructions further cause the at least one processor to:
  determine a relative distance between the respective interest group membership vector of the first user and the at least one hypothetical interest group membership vector; and
  provide an indication of the determined relative distance.

56. The system of claim 51 wherein the processor-executable instructions further cause the at least one processor to:
  identify at least one other set of users with which the first user is more compatible based on the respective interest group membership vector of the first user and at least one hypothetical interest group membership vector of the at least one other set of users; and
  provide an indication of the determined other set of users with which the first user is more compatible.

57. The system of claim 56 wherein the processor-executable instructions further cause the at least one processor to:
  select the set of users based on at least a first characteristic that is common to the users of the first set; and
  select the at least one other set of users based on at least a second characteristic that is common to the users of the second set and not common to the users of the first set.

58. The system of claim 56 wherein the processor-executable instructions further cause the at least one processor to:
  select the set of users based on at least a first geographical locale that is common to the users of the first set; and
  select the at least one other set of users based on at least a second geographical locale that is common to the users of the second set and not common to the users of the first set.

59. The system of claim 33 wherein the processor-executable instructions further cause the at least one processor to:
  select a first subset of the users based on traits other than user interests; and
  wherein the processor-executable instructions that cause the at least one processor to assess at least one of the users based at least in part on at least one of the interest group membership vectors, further cause the at least one processor to:
  assess a dissimilarity of the users of the first subset of users with a first one of the users based on a respective interest group membership vector for the first one of the users with the respective interest group membership vector for the other one of the users in the first subset of the users.

60. The system of claim 33 wherein the processor-executable instructions further cause the at least one processor to:
  determine at least one hypothetical interest group membership vector based on the respective interest group membership vectors of a plurality of the users;
  wherein the processor-executable instructions that cause the at least one processor to assess at least one of the users based at least in part on at least one of the interest group membership vectors, further cause the at least one processor to:
  display at least one interest-based characteristic of the group identified at least in part via the hypothetical interest group membership vector.

61. The system of claim 33 wherein the processor-executable instructions further cause the at least one processor to:
  determine a first hypothetical interest group membership vector based on the respective interest group membership vectors of a first plurality of the users; and
  determine a second hypothetical interest group membership vector based on the respective interest group membership vectors of a second plurality of the users;
  wherein the processor-executable instructions that cause the at least one processor to assess at least one of the users based at least in part on at least one of the interest group membership vectors, further cause the at least one processor to:
  assess at least one of a similarity or a dissimilarity between the first plurality of the users the second plurality of the users by comparing the first hypothetical interest group membership vector with the second hypothetical group membership vector.

62. The system of claim 33 wherein the processor-executable instructions further cause the at least one processor to:
  determine the first hypothetical interest group membership vector based on the respective interest group membership vectors of the first plurality of the users who share at least a first non-interest based trait and a second non-interest based trait; and
  determine a second hypothetical interest group membership vector based on the respective interest group membership vectors of the second plurality of the users who share at least the first non-interest based trait and a third non-interest based trait that is different than the second non-interest based trait;
  wherein the processor-executable instructions that cause the at least one processor to assess at least one of the users based at least in part on at least one of the interest group membership vectors, further cause the at least one processor to:
  assess the interests of the first plurality of the users as provided by the first hypothetical interest group membership vector with the interests of the second plurality of the users as provided by the second hypothetical group membership vector.

63. The system of claim 62 wherein the processor-executable instructions that cause the at least one processor to determine the first hypothetical interest group membership vector based on the respective interest group membership vectors of the first plurality of the users who share at least a first non-interest based trait and a second non-interest based trait, further cause the at least one processor to:
  determine the first hypothetical interest group membership vector based on the respective interest group membership vectors of the first plurality of the users who share at least a first non-interest based trait and a second non-interest based trait that includes a defined first geographic location; and
  wherein the processor-executable instructions that cause the at least one processor to determine by the at least one processor the second hypothetical interest group membership vector based on the respective interest group membership vectors of the second plurality of the users who share at least the first non-interest based trait and a third non-interest based trait further cause the at least one processor to;

determine the second hypothetical interest group membership vector based on the respective interest group membership vectors of the second plurality of the users who share at least the first non-interest based trait and a third non-interest based trait that includes a defined second geographic location.

64. The system of claim 62 wherein the processor-executable instructions that cause the at least one processor to determine by the at least one processor the first hypothetical interest group membership vector based on the respective interest group membership vectors of the first plurality of the users who share at least a first non-interest based trait and a second non-interest based trait further cause the at least one processor to:

determine by the at least one processor the first hypothetical interest group membership vector based on the respective interest group membership vectors of the first plurality of the users who share at least a first non-interest based trait that includes a defined first geographic location and a third non-interest based trait; and wherein the processor-executable instructions that cause the at least one processor to determine the second hypothetical interest group membership vector based on the respective interest group membership vectors of the second plurality of the users who share at least the second non-interest based trait and a third non-interest based trait, further cause the at least one processor to:

determine the second hypothetical interest group membership vector based on the respective interest group membership vectors of the second plurality of the users who share at least the second non-interest based trait that includes a defined second geographic location and the third non-interest based trait.

\* \* \* \* \*